A. McKENZIE.
VOTING MACHINE.
APPLICATION FILED SEPT. 11, 1899.

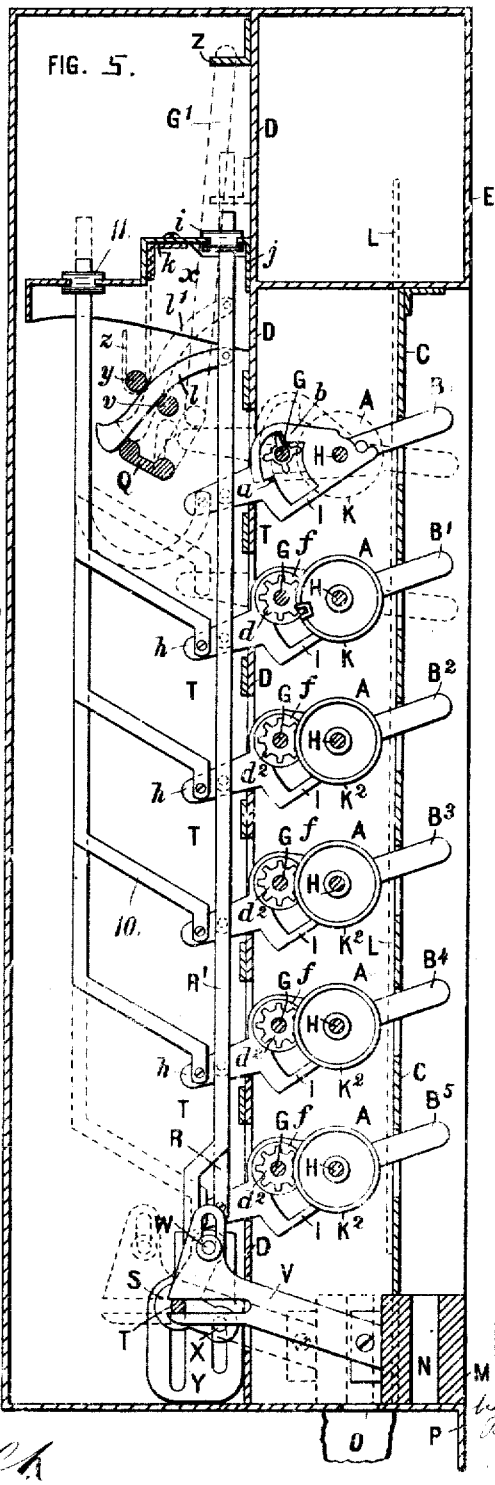

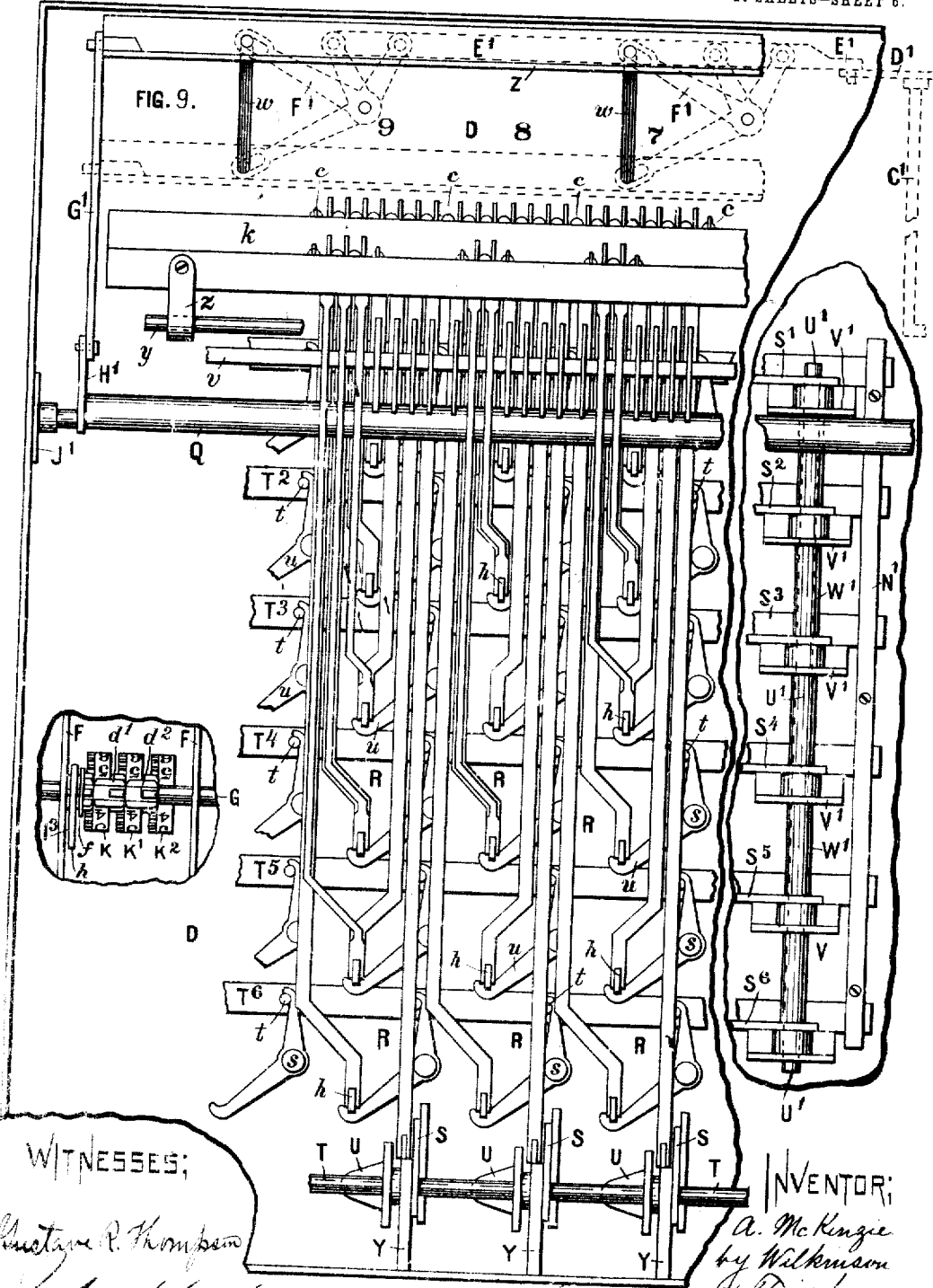

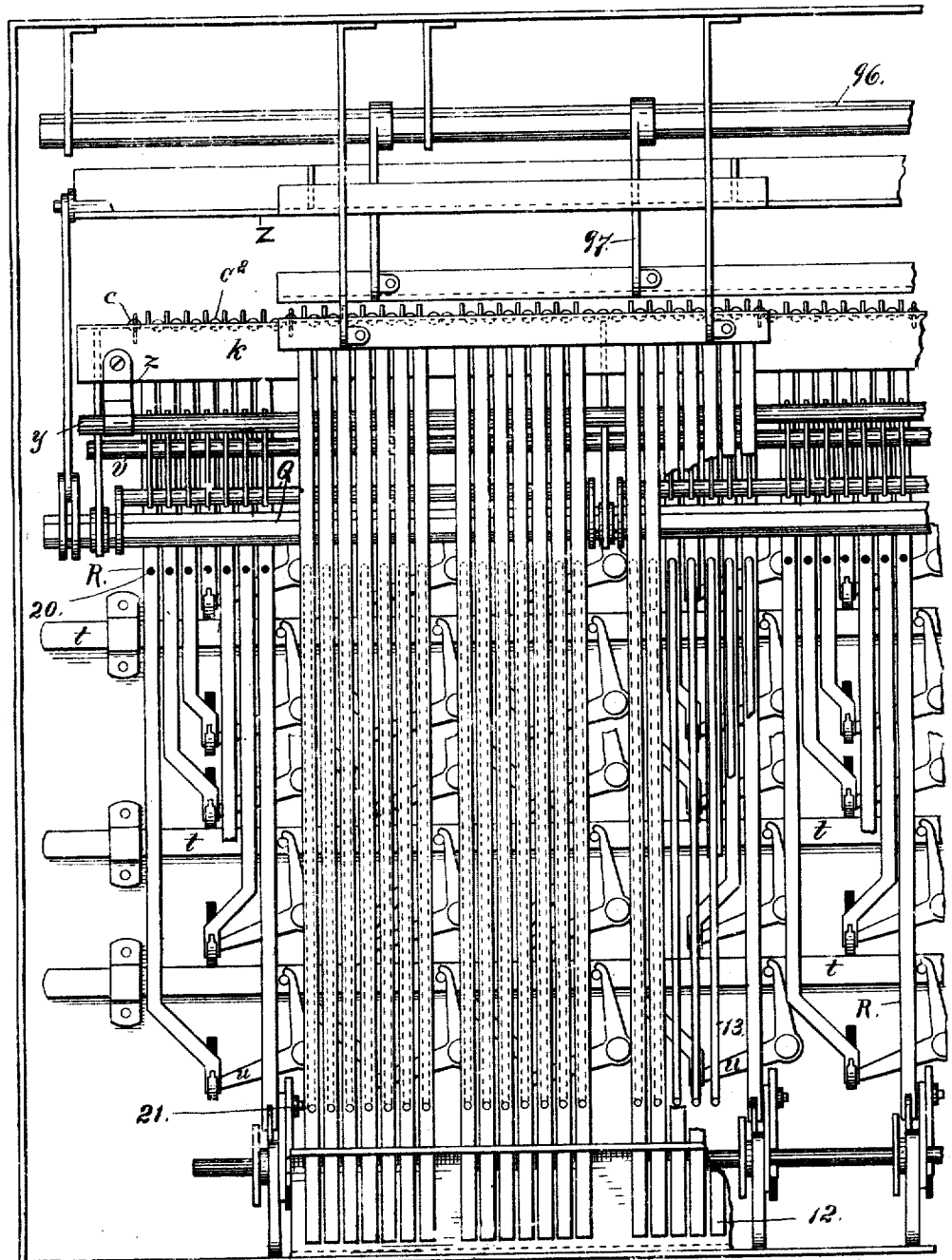

943,041.

Patented Dec. 14, 1909.
20 SHEETS—SHEET 8.

A. McKENZIE.
VOTING MACHINE.
APPLICATION FILED SEPT. 11, 1899.

943,041. Patented Dec. 14, 1909.
20 SHEETS—SHEET 9.

Witnesses:
Gustave R. Thompson
John N. Hall

Inventor
A. McKenzie
by Wilkinson & Fisher
Attorneys

A. McKENZIE.
VOTING MACHINE.
APPLICATION FILED SEPT. 11, 1899.

943,041.

Patented Dec. 14, 1909.
20 SHEETS—SHEET 10.

Witnesses:

Inventor:
A. McKenzie
by Wilkinson
& Fisher
Attorneys

A. McKENZIE.
VOTING MACHINE.
APPLICATION FILED SEPT. 11, 1899.

943,041.

Patented Dec. 14, 1909.
20 SHEETS—SHEET 12.

Witnesses
Gustave R. Thompson.

Inventor
A. McKenzie.
by Wilkinson & Fisher
Attorneys.

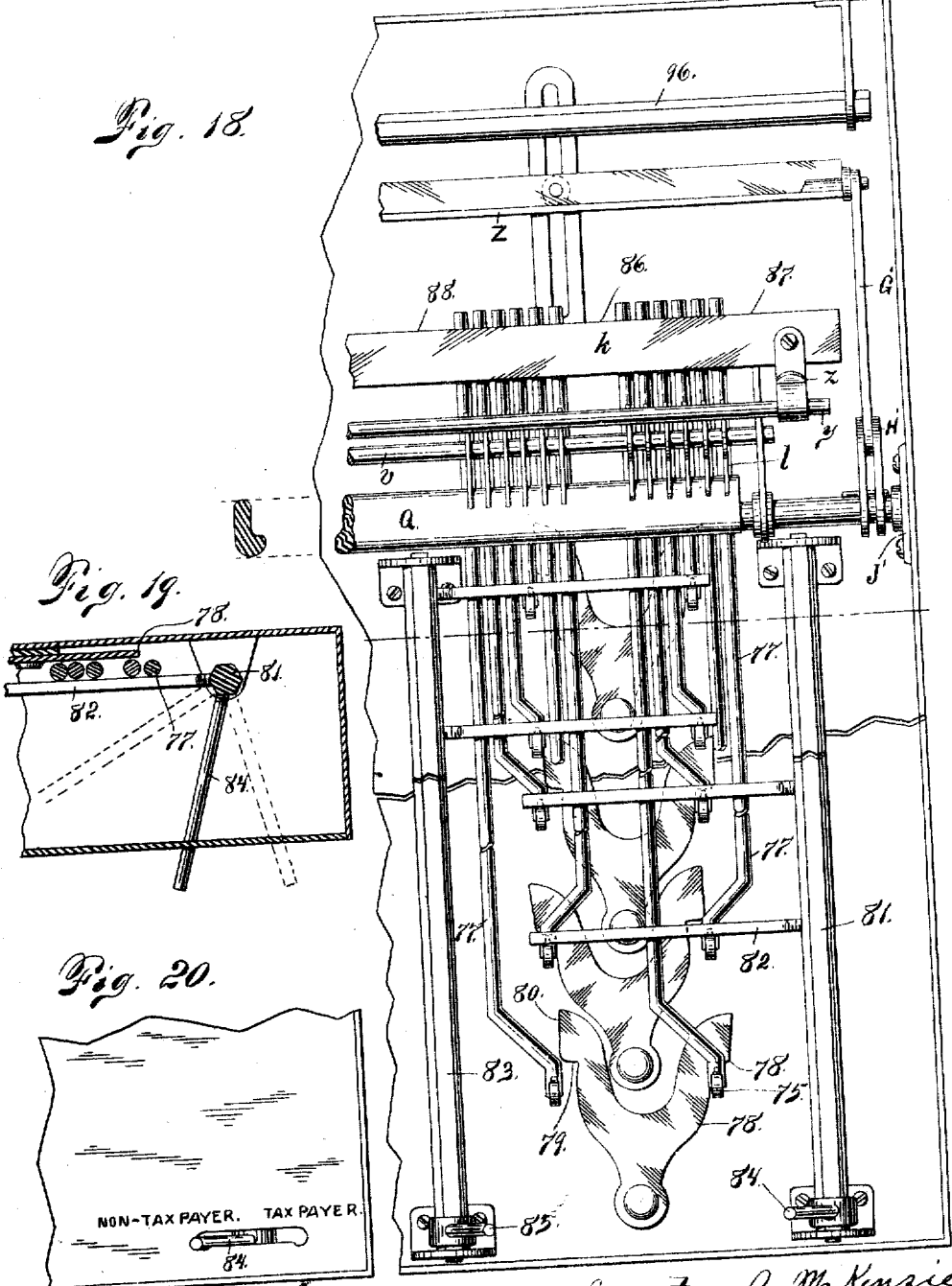

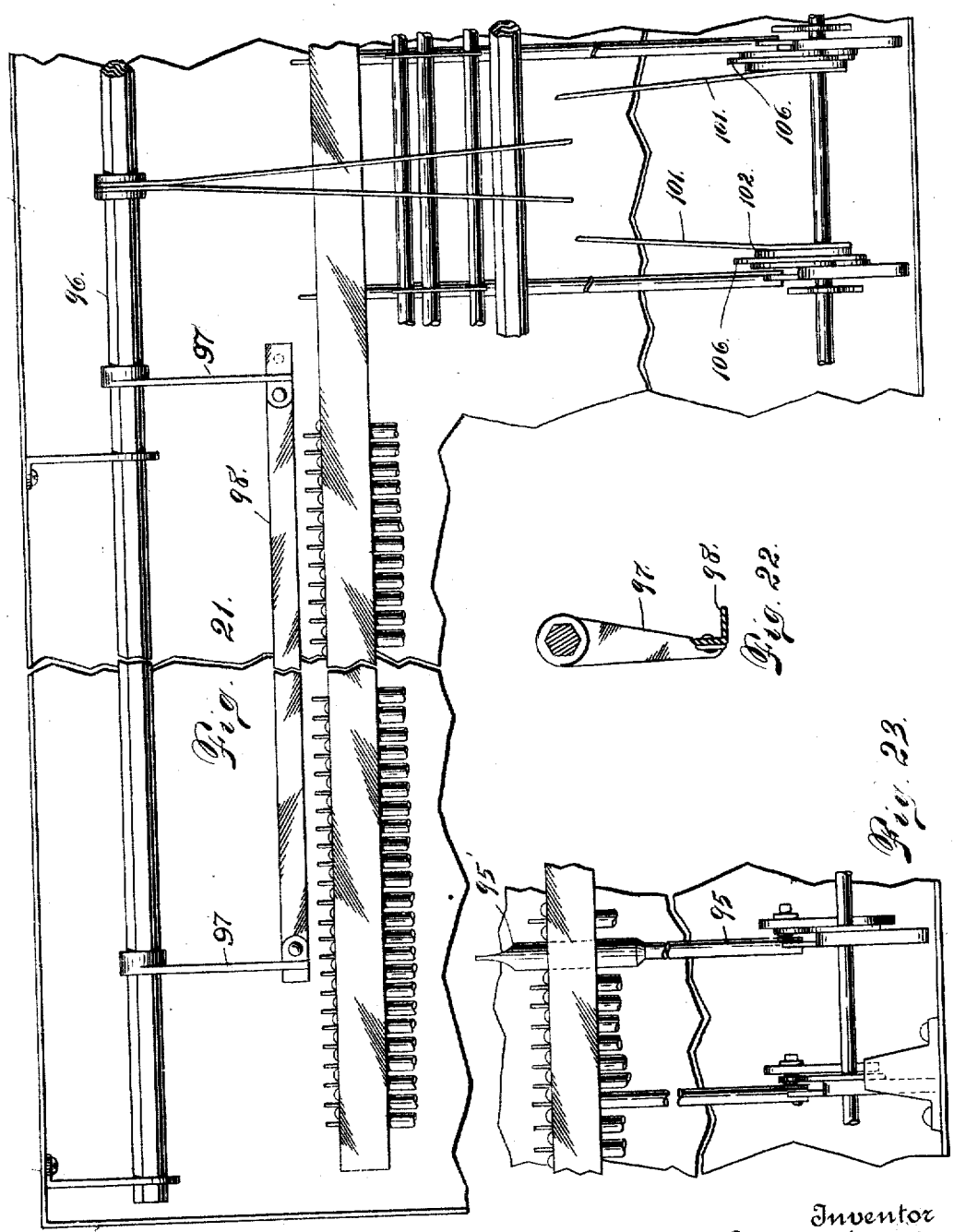

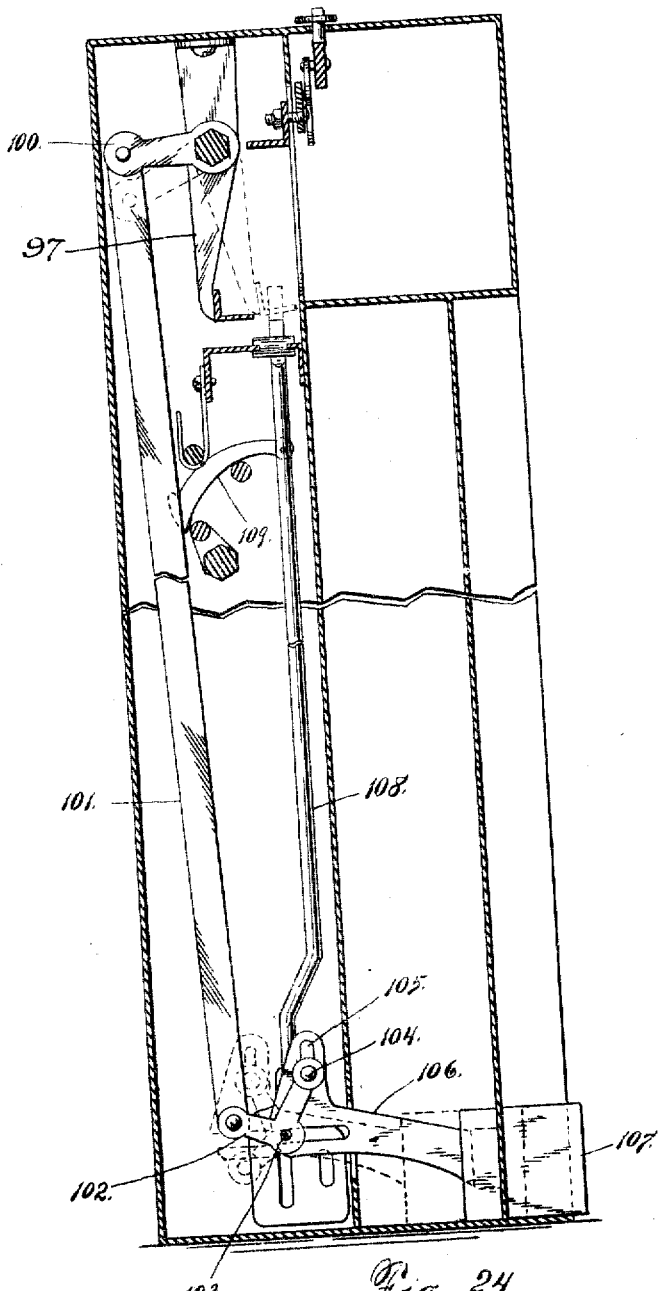

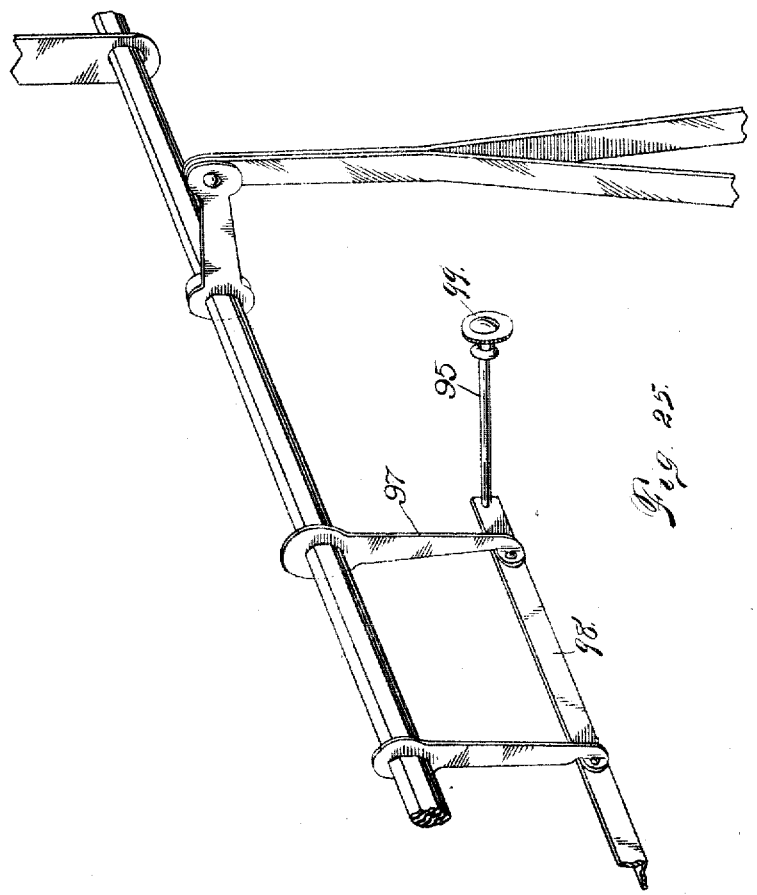

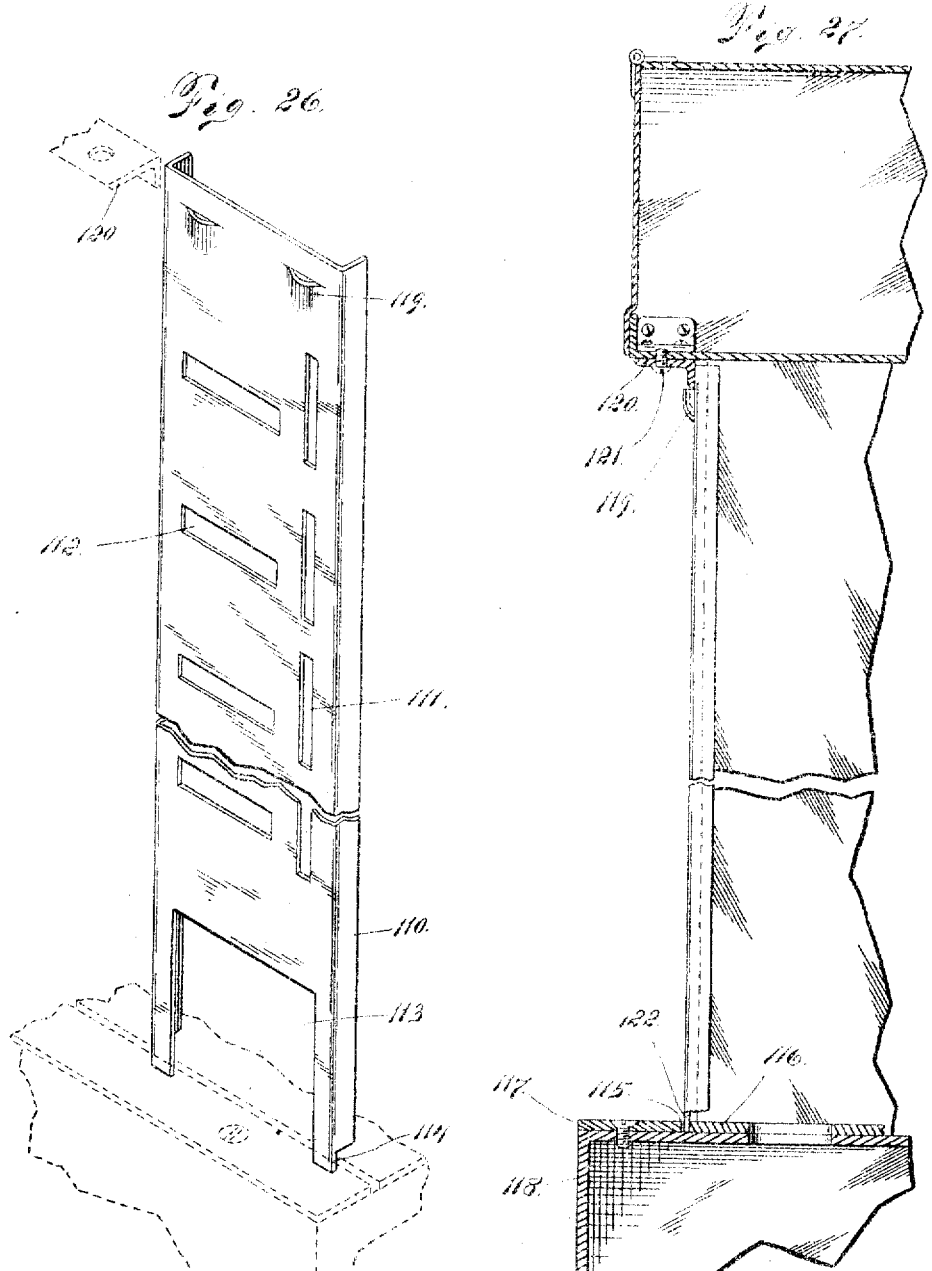

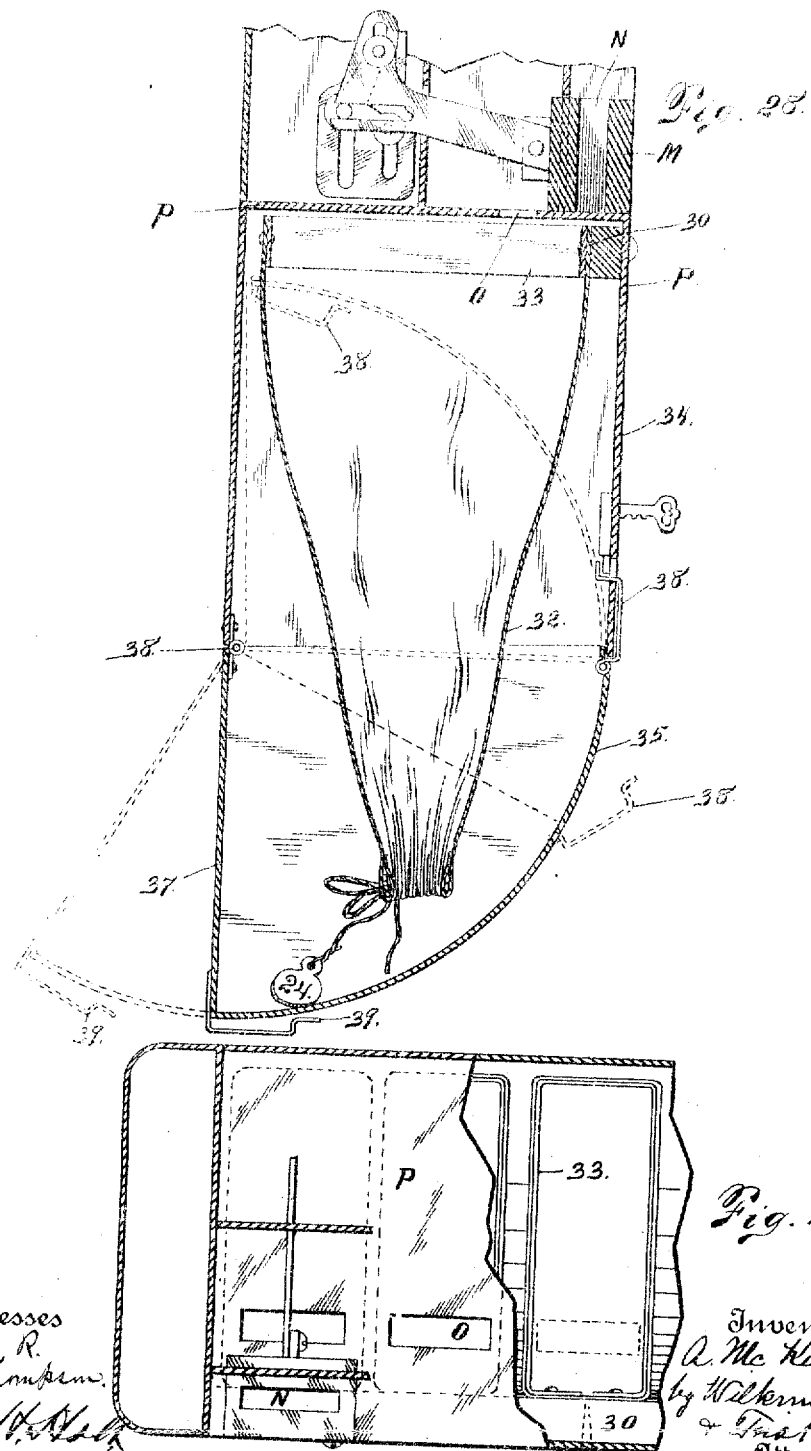

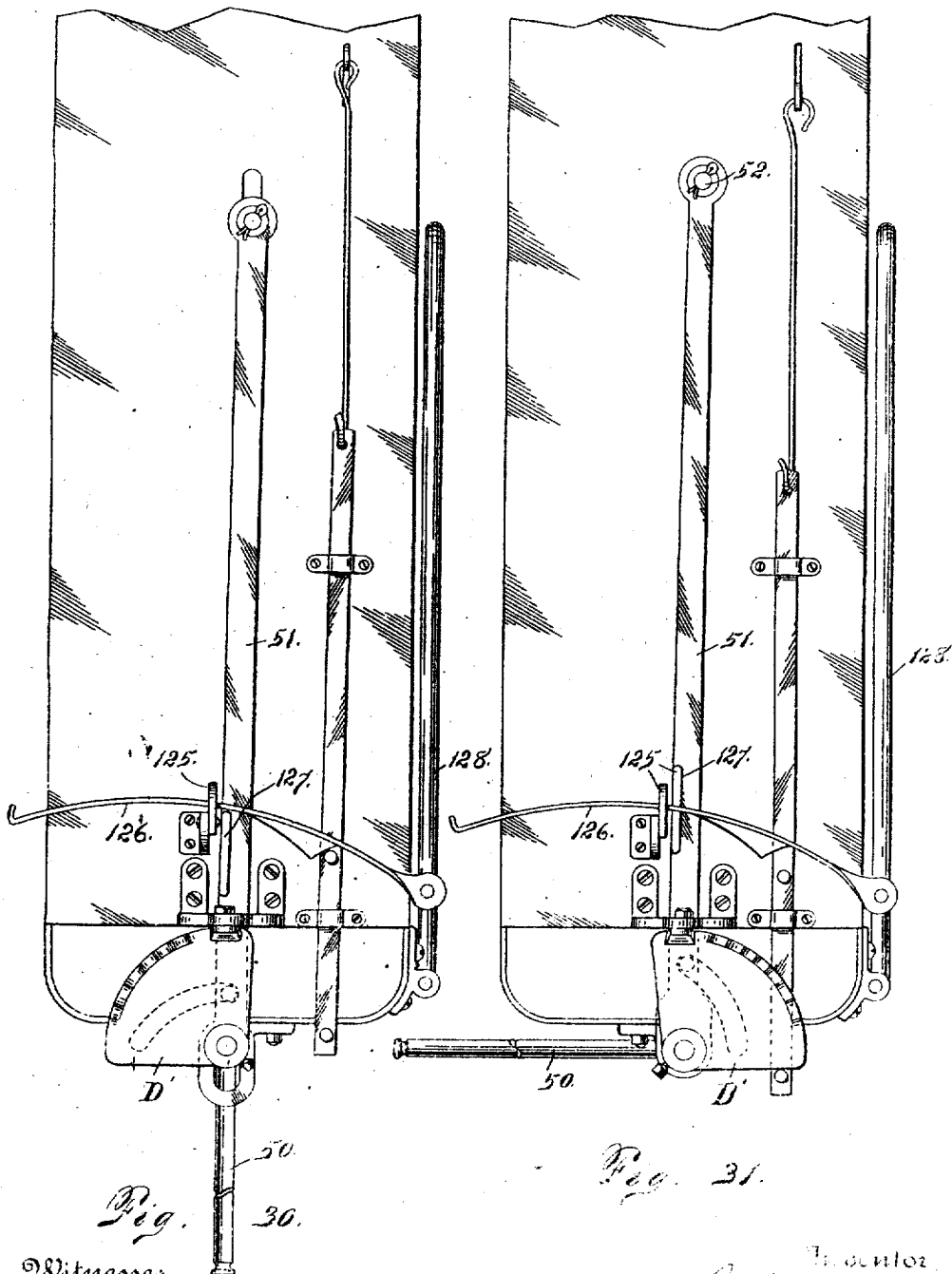

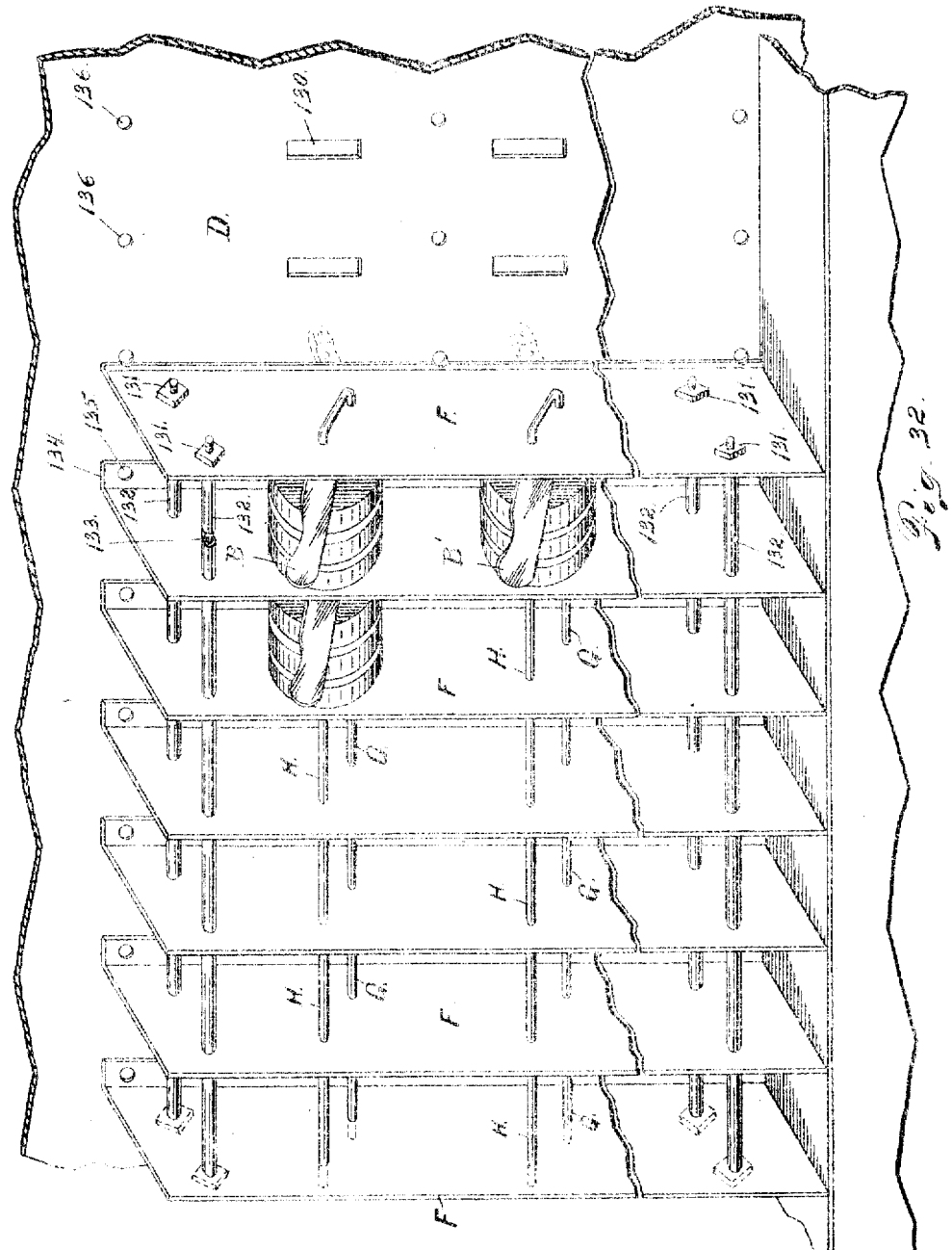

UNITED STATES PATENT OFFICE.

ANGUS McKENZIE, OF JAMESTOWN, NEW YORK, ASSIGNOR, BY MESNE ASSIGNMENTS, TO EMPIRE VOTING MACHINE COMPANY, OF ROCHESTER, NEW YORK, A CORPORATION OF NEW YORK.

VOTING-MACHINE.

943,041.  Specification of Letters Patent.  Patented Dec. 14, 1909.

Application filed September 11, 1899. Serial No. 730,140.

*To all whom it may concern:*

Be it known that I, ANGUS MCKENZIE, a British subject of Canada, residing at Jamestown, in the county of Chautauqua and State of New York, have invented certain new and useful Improvements in Voting-Machines; and I do hereby declare the following to be a full, clear, and exact description of the invention, such as will enable others skilled in the art to which it appertains to make and use the same.

The object of my invention is to provide a simple and effective machine for the registration of votes which will prevent the voter from doing anything which the law does not entitle him to do, which provides for a plurality of parties and single, multi-candidate groups, straight ticket voting, special interlocking means for indorsed candidates, free ballot depositing device, means for locking the keys and counters, and an interlocking device between the keys and the shutters which expose the counters.

The details of my invention are set forth in the accompanying drawings, in which—

Figure 1:
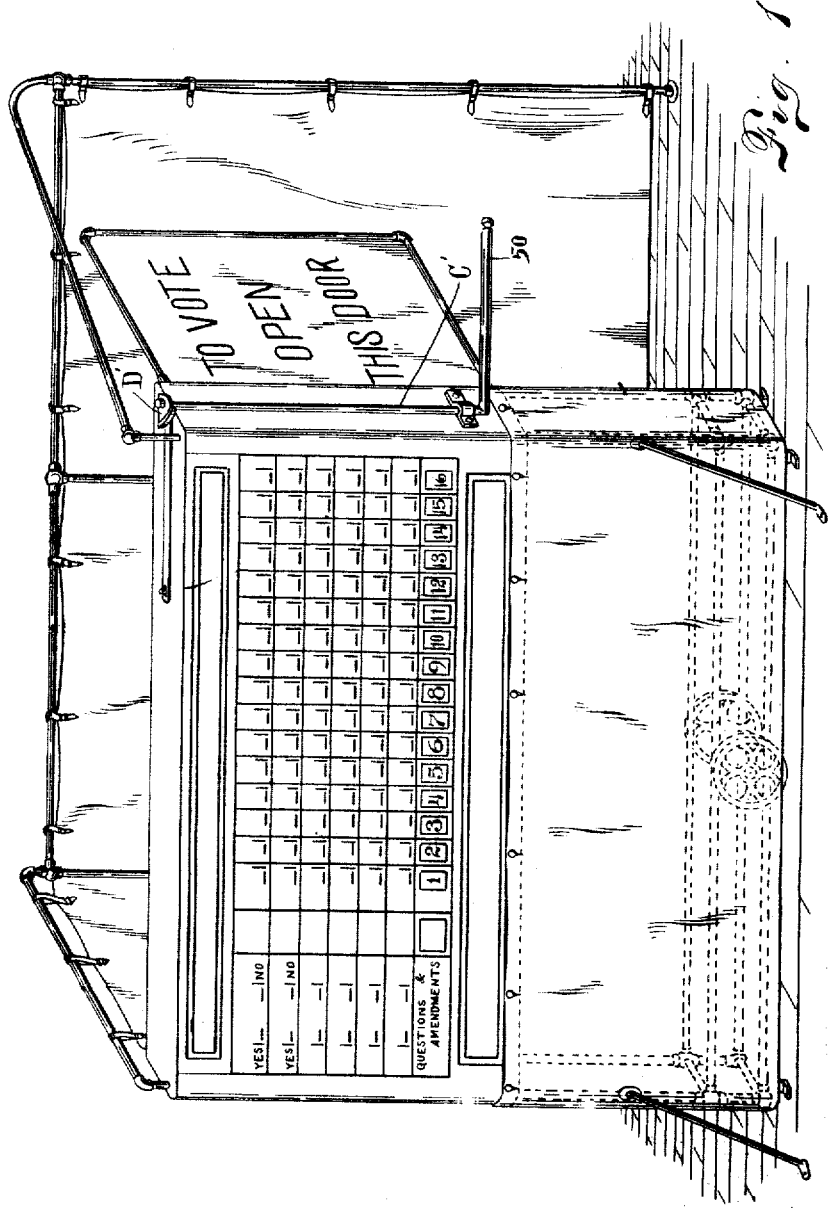
Figure 2:
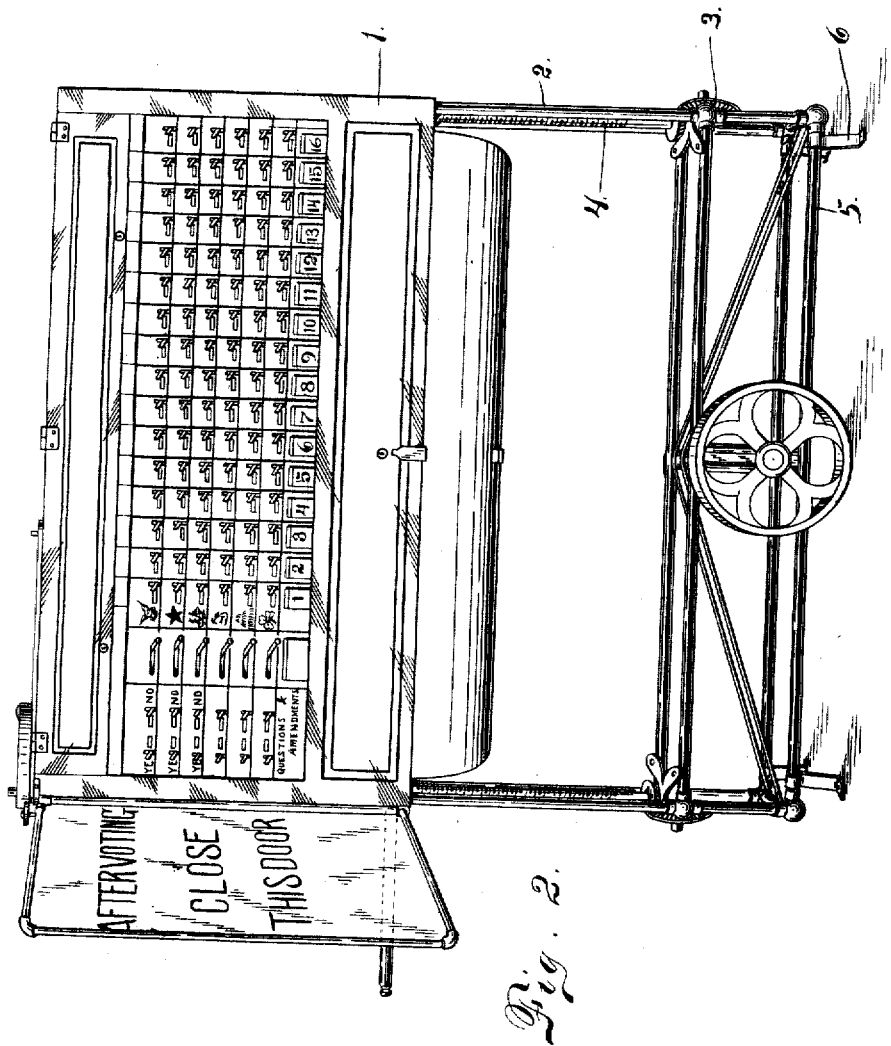
Figure 3:
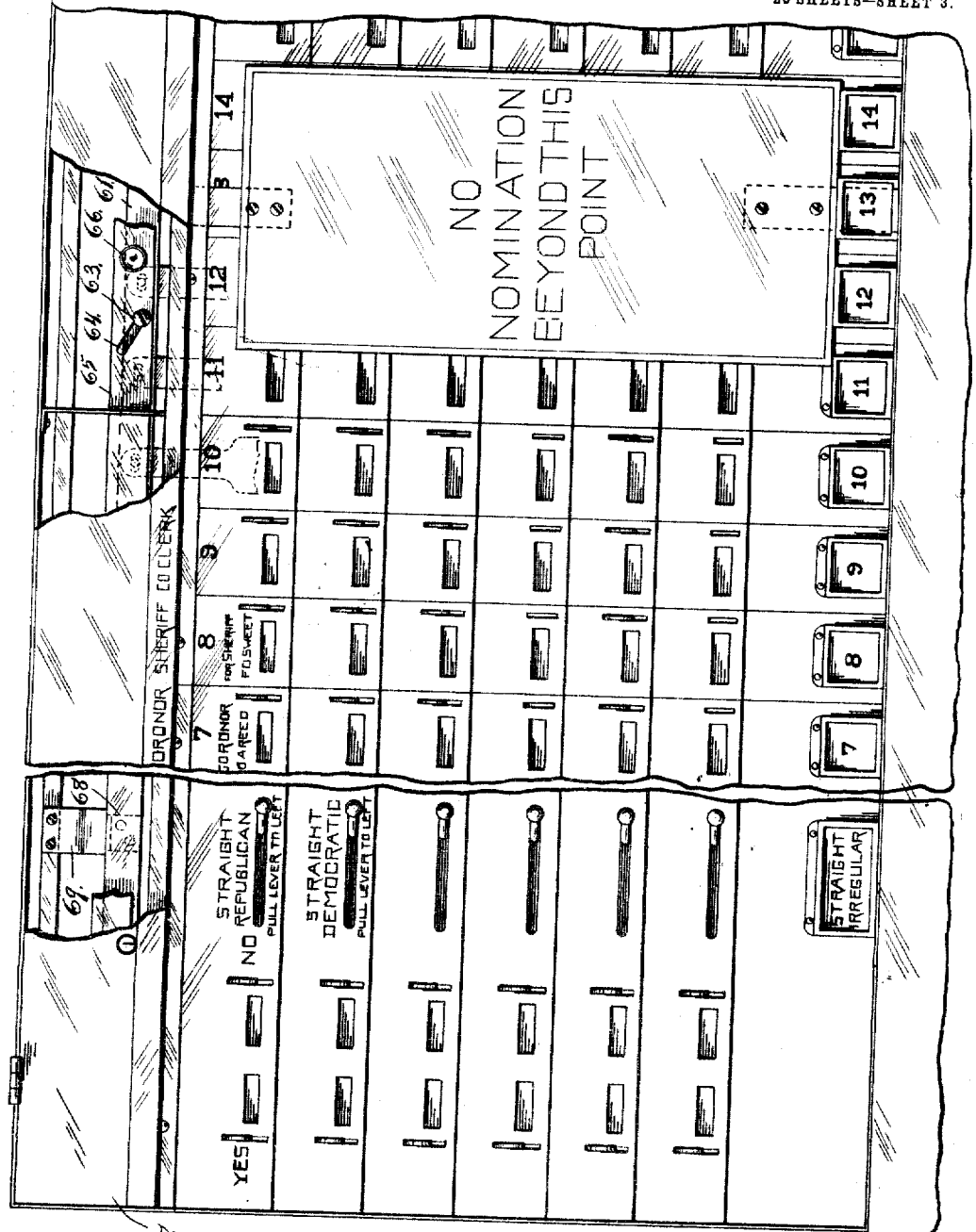
Figure 4:
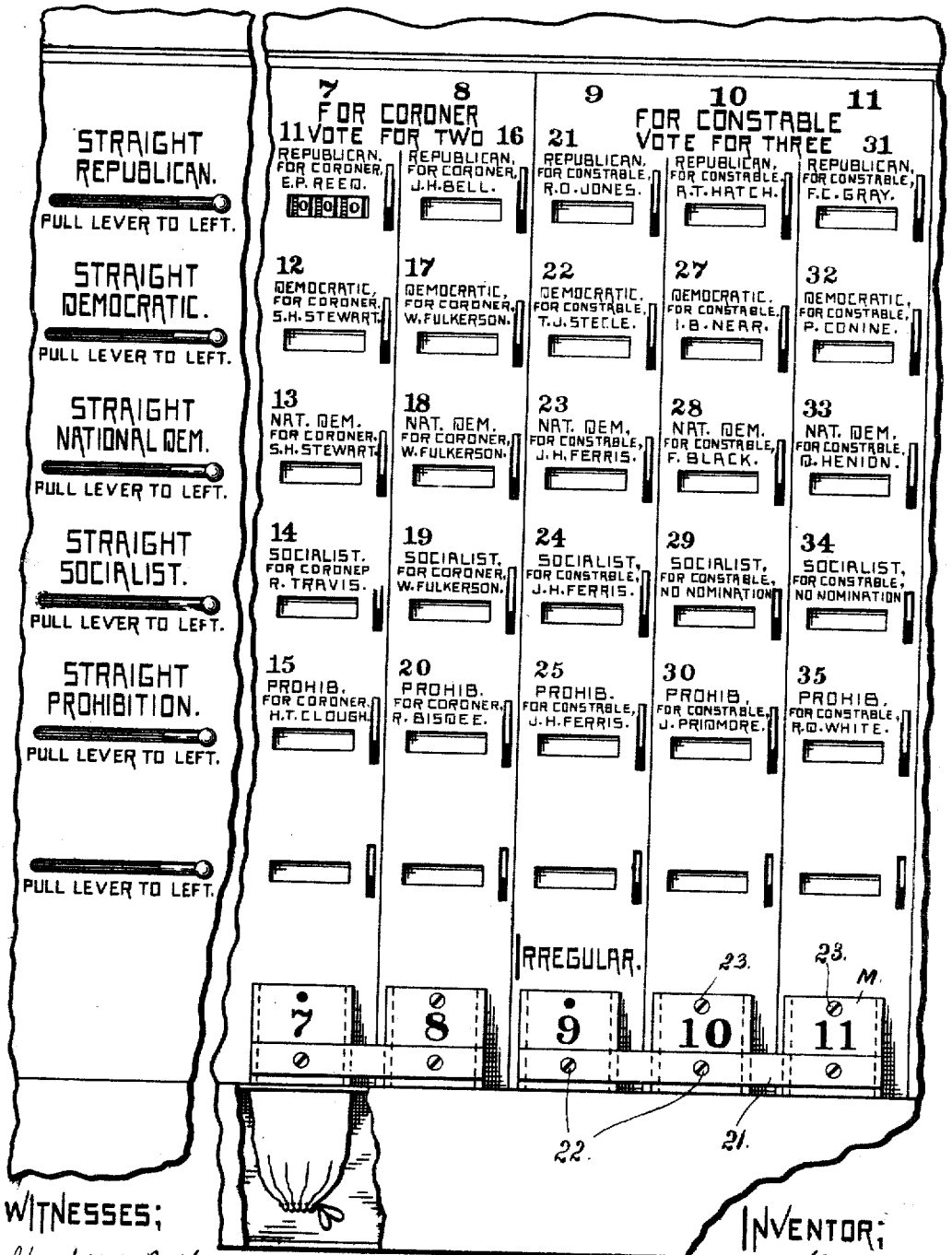
Figure 11:
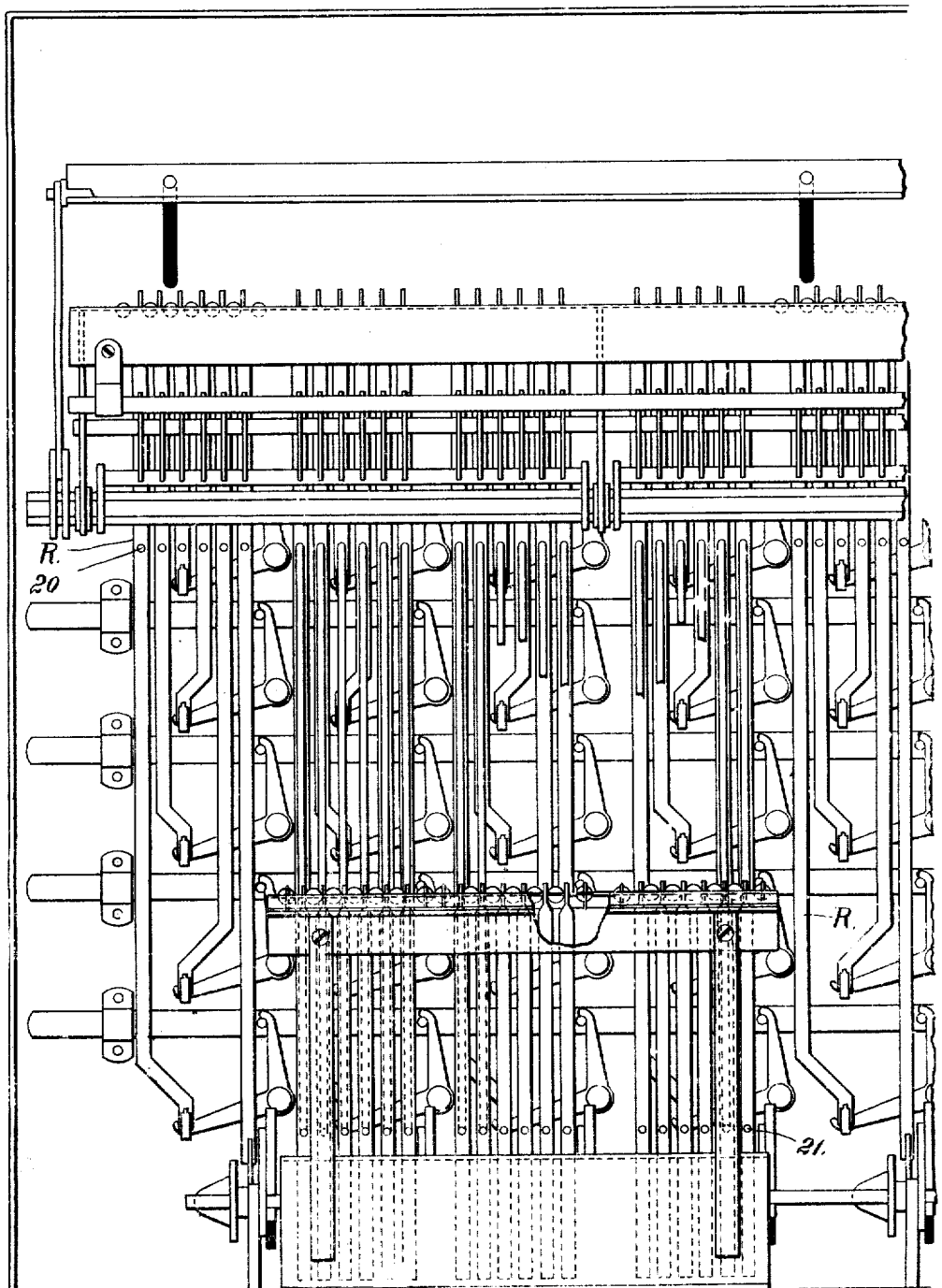
Figure 12:
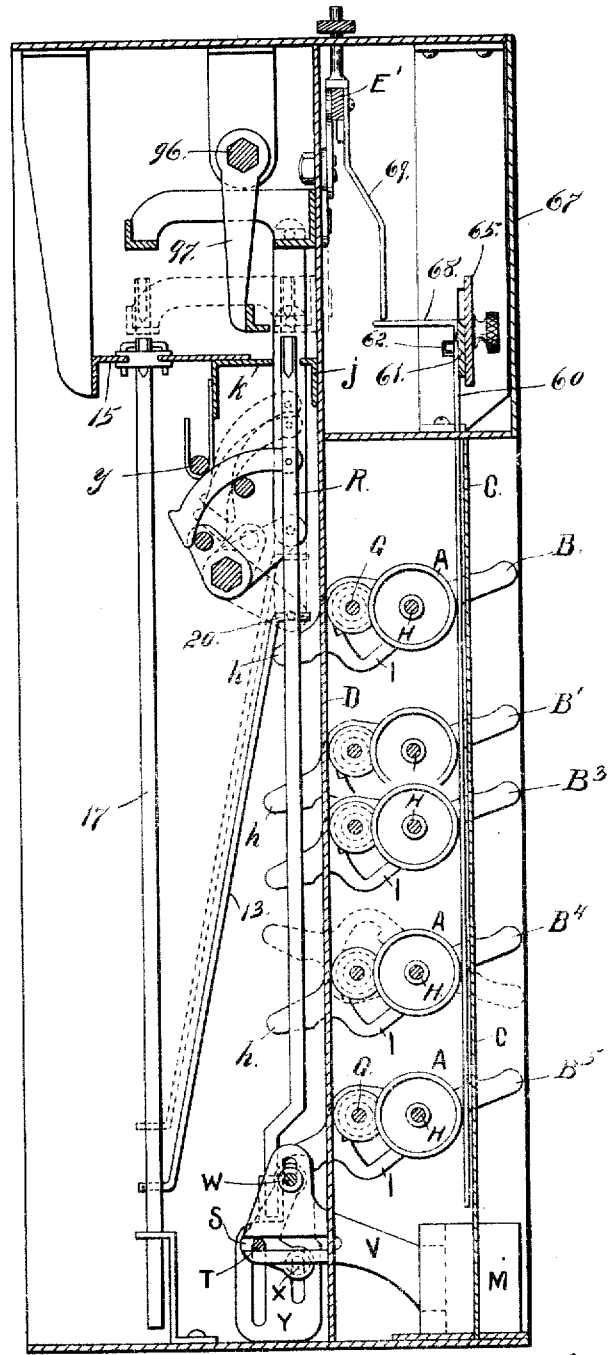
Figure 13:
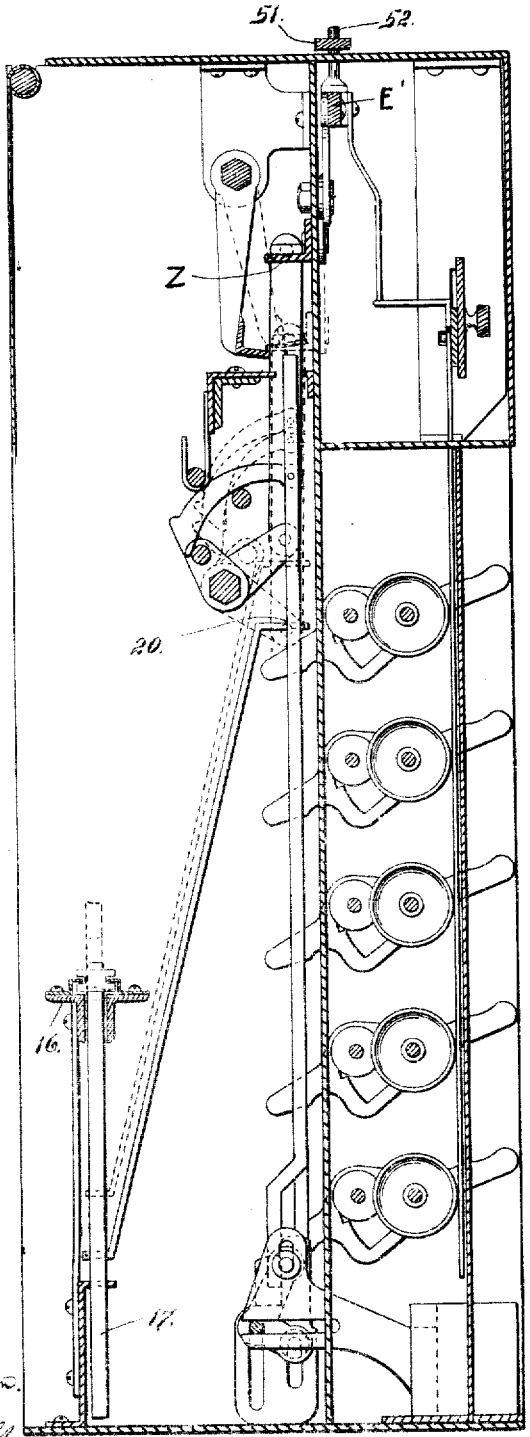
Figure 14:
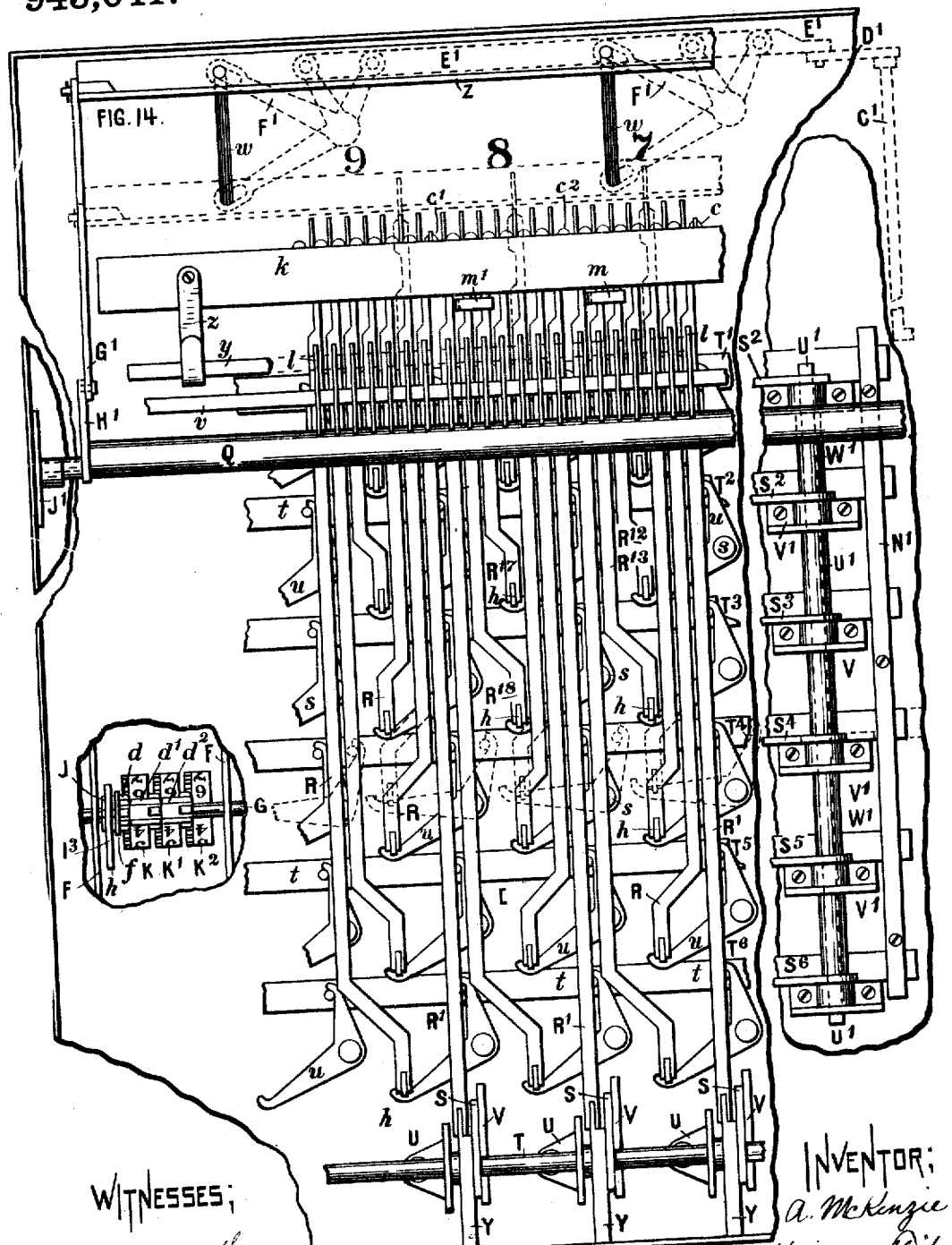
Figure 15:
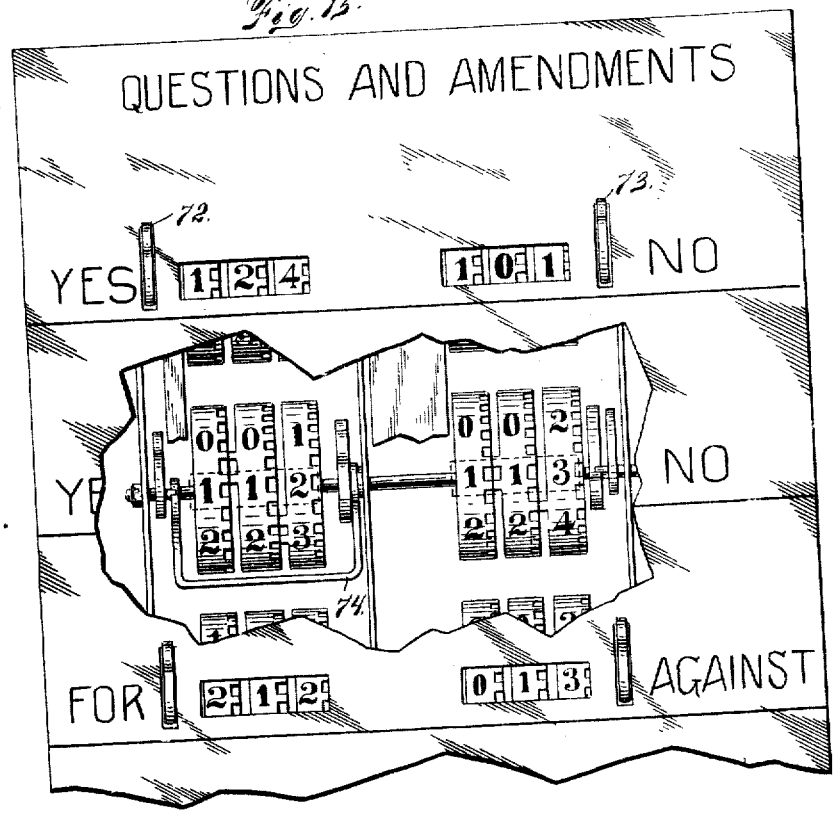
Figures 16, 17:
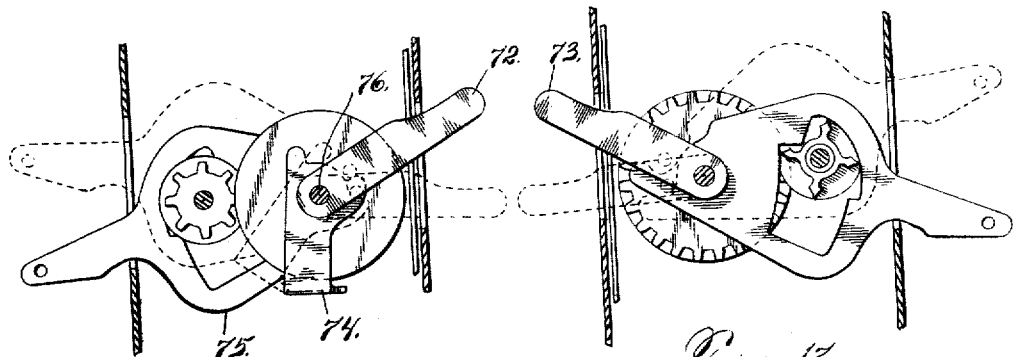

Figure 1 is a perspective view of my machine in connection with a portable booth which I have provided therefor. Fig. 2 is a front view of my machine. Fig. 3 is a detailed view of the keyboard, showing the "Yes" and "No," the straight ticket and the individual candidate keys, and the free ballot devices. Fig. 4 is a detailed view of the keyboard of the machine, showing the ballot as it is placed thereon in multi-candidate groups in which indorsed candidates are to be provided for. Fig. 5 is a cross section of the machine, showing the keys, counter actuators, free ballot depositing device and the double set of interlocking means. Fig. 6 is a detailed view of the channel and the locking blocks carried therein. Fig. 6ᴬ is a detail view of a modified form of the group interlock. Fig. 7 is a detailed view of the voting key, counter actuator and the four pointed star wheel by which the counter is operated. Fig. 8 is a detailed view of the bell crank lever which connects the free ballot depositing device with its interlocking means. Fig. 9 is a rear elevation of the interlocking system and the resetting means. Figs. 10 and 11 are rear elevations of a different type of double interlocking system. Figs. 12 and 13 are sectional elevations of Figs. 10 and 11 respectively. Fig. 14 is a rear elevation of the interlocking system of the machine, showing special means by which an indorsed candidate is interlocked against himself in a multi-candidate group. Fig. 15 is a detailed view of the "Yes" and "No" keys and counters. Fig. 16 is a detailed view of the "Yes" key, and Fig. 17 is a detailed view of the "No" key. Fig. 18 is a rear elevation of the "Yes" and "No" interlock. Fig. 19 is a cross section of one of the lockouts for the "Yes" and "No" keys. Fig. 20 is a rear elevation of the handle by means of which the "Yes" and "No" lockout is operated. Fig. 21 is a rear elevation of the woman's lockout. Fig. 22 is a detail of the hanger which connects the woman's lockout bar to the rock shaft which carries it. Fig. 23 is a detail showing how the free ballot may be provided for in multi-candidate groups. Fig. 24 is a sectional elevation of the woman's lockout. Fig. 25 is a perspective of the woman's lockout, with a push button by which it is operated by the judge. Figs. 26 and 27 are details of the manner of fastening the face plate on the machine. Fig. 28 is a sectional elevation of the free ballot depositing device. Fig. 29 is a plan view of the face plate of the machine broken away to show the free ballot receptacle beneath it. Fig. 30 is a plan view of the top of the machine when the arm on the end of the machine is in position whereby the door covering the straight ticket levers is released. Fig. 31 is the same, with the arm on the end of the machine in position which locks the door covering straight ticket levers. Fig. 32 is a general view showing the manner of assembling the counters in the machine.

In the accompanying drawings reference numeral 1 refers to the casing of the machine shown in Fig. 2, supported on suitable standards 2, which in turn are carried by a wheel truck 3. A suitable screw 4 is carried by each end of the truck which turns in a nut in the end of the machine case, and the screws on the opposite ends of the machine are connected by beveled gears to a shaft which runs the length of the machine and makes them rotate together, thus rotating the screws at both ends of the machine simultaneously. A suitable crank is placed on the square end at each end of the shaft by means of which the screws are turned. The bottom rails 5 of the truck carry suitable feet 6 pivoted thereon which can be thrown down to firmly support the machine and keep it from tilting. On the keyboard of the machine, as shown in Figs. 2 and 3, are the "Yes" and "No" keys, the straight ticket keys and the individual candidate keys, together with the free ballot depositing device. In Fig. 4 I have shown two multi-candidate groups, one for the group of coroners and the other for the group of constables, in each of which occur indorsed candidates. Thus in row 7 of Fig. 4, Mr. Stewart is nominated by both the Democratic and National Democratic, while Mr. Fulkerson is nominated by the Democratic, National Democratic and Socialist, in row 8, and in the group of constables in row 9, Mr. Ferris is nominated by the National Democratic, the Socialist and Prohibition. It is obvious that the voter is privileged to operate any two keys in the group of coroner and any three keys in the group of constable, and, to prevent the voter from operating both of the keys which belong to Stewart, in one case, and all three of the keys belonging to Ferris in the other, these and the keys which belong to Fulkerson must not only be interlocked against the remaining keys in that group, but must also be interlocked against themselves. So that all the keys belonging to any one candidate will form an auxiliary group in themselves, only one key of which can be voted. This and the indorsed candidate group can be provided for, if necessary, by having the candidate's name appear but once on the keyboard, in which case it is obvious that one vote only can be cast for him, but this does not provide for voting for him by any of the straight ticket levers of the parties which have nominated him, except the one belonging to the party in connection with which he has elected that his name shall appear on the keyboard. Hence, in order to provide for straight ticket voting throughout the machine, it is necessary that the candidate's name shall appear in connection with every party which has nominated him, so that he can be voted for by operating the straight ticket lever which belongs to that party. By reference to Fig. 5 will be seen one of the ways in which I provide for this. The keys B, B', B², B³, B⁴, B⁵, belong in the order named to the parties which are indicated on Fig. 4, and each is operated by the straight ticket lever of the party to which it belongs by means which are more fully shown in Figs. 9 and 10. The key B is pivoted to the shaft H and on it is carried the pin shown in both Figs. 5 and 7. The counter actuator I is also carried on the shaft H and has the curved slot therein with the pallets a and b, which alternately engage with the four pointed star wheel j carried on the shaft G. The oscillation of the actuator I brings the pallets a and b alternately into engagement with the points e shown in Fig. 7, and for one complete oscillation of the counter actuator the four pointed star wheel j is advanced one quarter of a revolution.

As will be seen in Fig. 5, positively connected to the four pointed star wheel is the gear wheel f of eight teeth, which in turn engages with the units wheel of the counter which has twenty teeth on its periphery, which is shown in the part broken away in Fig. 9. The movement of the four pointed star wheel through the quarter of a revolution moves the units wheel through one-tenth of a revolution and thus registers one complete vote. The motion of the units wheel is communicated to the tens wheel once in every complete revolution of the units wheel by means of the mutilated gear form of transfer mechanism shown in Fig. 9, by means of which the tens wheel is positively moved through the transfer mechanism. The hundreds wheel in the same way is rotated by the tens wheel and through its transfer gear $d^2$ is held locked against movement except through the tens wheel. In consequence of which, by holding the counter actuator firmly in engagement with the four pointed star the movement of it is prevented and the counter is held firmly locked against operation. The counter actuator in each case has connected to its rear end an interlocking rod R which is lifted with the counter actuator and spreads the blocks i carried by the channel j. The blocks which mark the limit of the group are held firmly against movement along the channel by means of a staple which passes through slots cut in the side of the block and through holes cut in the channel plate as shown in Fig. 6 and when the loose space between the blocks which are held against movement is taken up by the insertion of the wedges carried by the interlocking rods R between the channel blocks, no more interlocking rods can be raised up and consequently no more keys can be depressed. This applies to the main interlocking system of the machine which has a wedge in it for every key on the keyboard of the machine and, by removing or inserting the staples q in the channel of which, the interlocking system may be divided off into any desired number of groups of any desired size. When an interlocking rod is raised the dog is raised with it and when it has reached a sufficient height it drops on the trip shaft Q and by means of the engagement between the dog and the trip shaft the interlocking rod is held locked against return movement, which prevents further operation of that key by the voter.

The auxiliary interlocking mechanism which I provide for indorsed candidates may be seen in Fig. 5. To the ends of counter actuators h is connected an auxiliary interlocking rod 10 which interlocks with the blocks 11 in an auxiliary channel at the top. Thus it will be seen that if a candidate is nominated at B¹ and indorsed at B², B³ and B⁴, the auxiliary interlocking mechanism will prevent the other three keys from being operated after the first one has been operated, although the main interlocking mechanism is still free to permit the operation of a second and a third key. These auxiliary interlocking rods are detachable so that any combination of keys may be interlocked against each other to provide for variations in the tickets nominated by the political parties in succeeding years. They are of graduated length proportioned to the distance between the interlocking channel and the counter actuator with which they are attached, so that the interlocking rods which can be used in connection with the keys of one party are of different length from those used in connection with the keys of other parties and cannot be used in connection with the keys of more than one party. The rear elevation of this duplicate interlocking system is shown in Fig. 9, in which is fully brought out another feature of this interlocking system.

The auxiliary channel which carries the blocks 11 is perforated throughout its length to provide for the placing of the interlocking blocks, locking them to position by means of the staples at any point or points throughout its length. Thus it will be seen in Fig. 9 that two interlocking rods are locked against each other in one place and two in another and three in another, although in the case of each auxiliary group it can be readily seen that, if all of the auxiliary interlocking rods could rise, all the keys in that group could be operated because, until three keys had been voted, the main interlocking mechanism would not obstruct the insertion of more keys.

By reference to Figs. 10, 11, 12 and 13 a modification of this auxiliary interlocking system will be found, in which a complete auxiliary interlocking system is placed in the machine behind the regular interlocking system and the auxiliary interlocking rods are made detachably connected to the main interlocking rods to which they belong. In Figs. 10 and 12 the main interlocking system is shown at the top of the machine on a level with the main interlocking system of the machine, while in Figs. 11 and 13 the auxiliary interlocking rods are shorter and the channel is placed nearer the bottom of the machine. It will be seen from the inspection of Figs. 10 and 11 that the interlocking rods R are provided with a line of holes 20 which run at an even height through the whole length of the machine, and in like manner the auxiliary interlocking rods 17 near their bottom are provided with a row of holes 21 and, in each case, a bent wire is provided which is permanently fastened to the main interlocking rods at the top and detachably fastened to the auxiliary interlocking rods at the bottom. It will be noticed that the main interlocking rods are always proportioned to the length of the place between the channel and the key which they interlock, while the auxiliary interlocking rods are all of even length. When it happens that a candidate is indorsed the wires 13 which connect the auxiliary interlocking rods with the main interlocking rods R, can be detached from all of the auxiliary interlocking rods, except those which belong to the indorsed candidates. Thus, when the keys are voted, those keys which have their wires disconnected from the auxiliary interlocking rods will be free to rise without carrying the auxiliary interlocking rods up with them, while those keys which have their wires connected to the auxiliary interlocking rods will carry the auxiliary interlocking rods up with the main interlocking rods. Auxiliary interlocking rods are provided with the same kind of an interlocking channel and sliding blocks as are provided in the case of the main interlocking rods, but in each group sufficient space only is left for the insertion of an interlocking wedge and, when any one key has been raised which carries up its auxiliary interlocking rod with it, the remaining keys which are positively connected with auxiliary interlocking rods interlocked with the rod which has been raised, cannot be raised, and thus the indorsed candidate may be provided for in this way. And this system is a very convenient one, in that the interlocking rods for the indorsed candidates are always in place and ready to be used and all that is necessary to throw them into operation is to pass the loose ends of the wires through the holes in the bottom of the auxiliary interlocking rods, in which case they are positively connected to and moved with the main interlocking rods. But this system has another function equally as important which is brought out in Fig. 11, and that is for forming a special multi-candidate grouping device. It is evident on the inspection of Fig. 9 that when a multiplicity of interlocking rods are raised in any one single candidate group, the rods become spread apart and the room between the counter actuators is soon taken up, so that, as the rods are spread farther by the insertion of more keys, they strike against the top counter actuator, which prevents them from spreading farther, and on this account the top counter actuators place certain limitations upon the size of the group which can be operated with this interlocking system. Thus it will be seen, on reference to Figs. 5 and 9, that if a voter chooses to vote B, B¹, B² and B³, if the size of the group permits it, the probability is that the top row of counter actuators will prevent the interlocking rods from spreading far enough to permit the actuation of the fourth key. To avoid this trouble and to provide for making a group of any desired size in consequence, the auxiliary interlocking system shown in Figs. 10 and 11 and 12 may be used for a different purpose than that of the indorsed candidates. In this case the interlocking blocks will be removed from the main channel at the top of the machine in those groups which are intended to be combined in a multi-candidate group, and all the wires will be used to connect each main interlocking rod with its particular auxiliary interlocking rod. The grouping will then be entirely effected by means of the auxiliary channel and blocks 15, as shown in Fig. 12, or 16, as shown in Fig. 13. It is obvious that when the blocks are removed from the channel k and j, the interlocking rods R will have nothing to interfere with their straight upward movement, in consequence of which they will not be thrown aside by the interlocking blocks and there will be no limit from this source as to the number of interlocking rods that can be raised in each single candidate group. The interlocking, however, will be effected entirely by means of the auxiliary channel 15 and the auxiliary interlocking rods 17, which are positively connected to the main interlocking rods R by means of the wires 13, so that the counter actuators and keys cannot be moved, except as is permitted by the interlocking system 15 and 16.

In practice it has been found that it is not necessary to duplicate the interlocking system throughout the whole machine, as the regular interlocking system is sufficient to handle all multi-candidate groups of three or under. The multi-candidate groups of larger size occur very infrequently, so that provision for the throwing of six or eight single candidate groups together in this manner is amply sufficient. If, however, the auxiliary interlock is to be used for the indorsed candidate, it should then preferably be provided throughout the whole length of the machine, as the small multi-candidate groups in which indorsed candidates occur are liable to occur at several places along the keyboard, so that if this auxiliary grouping device were only local in its application, it could not be used in connection with any other groups except those in connection with which it was placed in the construction of the machine.

I have sometimes provided for the indorsed candidate in the manner indicated in m and m¹ in Fig. 14, which consists of a loop or yoke connected to one of them and engaging with the other of two interlocking rods lying side by side. This loop or yoke may be extended indefinitely, so as to engage a number of interlocking rods, if they are consecutively placed, the object being to permit one and one only of the interlocking rods thus engaged to be raised. In raising a single interlocking rod of the group formed by this loop, the tops of the rods will be spread by the wedges and the first rod raised will spread the interlocking rods to the limit permitted by the loop or strap m. I have provided for this in a similar way by means of a piece of strong wire, the ends of which are bent under the outer edge of the channel 16, shown in Fig. 13, and which passes up and around two or more of the tops of the interlocking rods above the blocks thus shown in a small detail 6ᴬ, shown in connection with the Fig. 6. This wire loop embraces all of the interlocking rods which can be interlocked for one indorsed candidate, and it leaves sufficient room between the interlocking rods for one, and one only, to be raised.

When the wire loop or the yoke m, m¹ is used, it is of course necessary that the interlocking rods of the indorsed candidates should all be placed consecutively to each other, so that the interlocking rods of the indorsed candidates and none others would be inside of and controlled by the loop. By reference to Fig. 11, the normal arrangement of the interlocking rods of the machine can be readily seen. The interlocking rod of the top row of keys rises straight up. The connecting rods of the second row of keys bend out to the right of the first keys, while the 3rd row bend out to the left of the first row of keys, and this alternation arrangement is followed throughout all the party rows below them, alternate rods turning to the right and left consecutively. Thus, it will be seen at a glance that the top row of keys can be interlocked by means of the wire loop with either the second row 3 or the party keys, or that all three of them can be locked together, but the second cannot be locked with the third, on account of the intervention of the first key. To provide for this, it has sometimes been found necessary to use the arrangement shown in Figs. 10 and 14, where it will be seen that the third and fourth interlocking rods have been interchanged, in that the third instead of going to the right goes to the left, just as the second one does while the fourth one previously went to the left, now goes to the right. Thus it will be seen that the second and third interlocking rods lie together and can be controlled by the loop m¹, as shown in Fig. 14. To accomplish this result, it is necessary to take the dog off of the interlocking rod while the interlocking rod is being turned around, after which it may be again fastened to it. It will be seen that by a comparison of this mode of interlocking the rods with that shown in Figs. 9 and 13, that the wire loop has a very obvious disadvantage over the methods shown in Figs. 12 and 13, for in the latter case all that is necessary is merely to connect or disconnect the wires 13 according to the needs of the occasion. Still another way which I provide for the indorsed candidates is shown in another pending application, in which all the counter-actuators or the keys which belong to the same candidate may be fastened together either by the strip of metal or any other preferred means, all the interlocking rods then being detached except one.

The free ballot depositing device which I preferably used in connection with my machine may be seen in Figs. 3, 4, 5 and others. Reference character M in Fig. 4 refers to the free ballot depositing device. This free ballot depositing device consists of a casting with an opening which runs through it vertically. This opening is as long as the space between the dotted lines shown in Fig. 4, and as wide as the space referred to by the letter N in Fig. 5. If a voter wishes to vote for a candidate who is not regularly nominated, a flat metal capsule which just fills this opening is provided him. He writes the name of the candidate for whom he wishes to vote on a piece of paper and places it in the metal capsule, which he places in the slot N. He then pushes the free ballot receptacle in, and, as it goes in through, the arm V in Fig. 5 which extends back from the free ballot receptacle, the bell crank lever S is rotated by means of a pivotal connection W with the slot in the arm V. The bell crank lever S is pivoted to the shaft T, around which it turns as a center, and, as the pivot W rotates to the left, the pivot X rises and carries with it the plate Y, which is slotted so as to carry past the shaft T and the pivot X. The pivot X carries the plate Y up with it until the dog on the interlocking rod which is raised with the plate engages with the trip shaft Q. When the machine is reset the rotation of the trip shaft Q still further raises the dog and interlocking rod, and this necessitates the provision of the slot in connection with the pivot X, together with the long slot in connection with the shaft T. As the trip shaft turns the free ballot receptacle is still further pulled in by the rocking of the bell crank S, which causes the pivot W to move still further to the left until the opening N in the free ballot receptacle comes over the opening O in the base plate of the machine, when the capsule drops through the opening into a sack below, as is shown in Fig. 4 and in Figs. 28 and 29. Instead of a metal capsule I have used a wooden block which just fills the opening. This block is covered with paper and affords a ready means by which a free ballot may be deposited. The voter simply writes the name of the condidate for whom he wishes to vote upon the block and inserts this, which makes the operation more simple and the wooden block itself is very much cheaper.

In a multi-candidate group it is necessary to provide against voting the same candidate's name through all of the free ballot depositing devices of the multi-candidate group and, to insure against this, I provide the means shown in Fig. 4, in which case all of the free ballot depositing devices of the multi-candidate group are connected together by means of the bar 21, which is connected to all the free ballot depositing devices of that multi-candidate group by means of the screws 22, so that all of the free ballot depositing devices must move together and, in this connection, I plug up all the openings N, except one of each group, by means of a wooden plug driven into this opening so tightly as to require the removal of the free ballot depositing device from the machine in order to remove it from the opening readily. Or, if preferred, I may stop the openings by means of the screws 23, which are shown in Fig. 4. The wooden plug, however, is, from actual experience, deemed to be preferable.

The free ballot depositing device which is left open should preferably be one about the middle of the group. In depositing the free ballot in a multi-candidate group it thus becomes necessary to vote for all the candidates of that group through the free ballot depositing device, for it is obvious that, if the limiting mechanism permits only three keys or three free ballot depositing devices to be operated and a single key be operated in the multi-candidate group, then the free ballot cannot be operated at all, for the bar 21 compels all three to move together and the limiting mechanism will only permit the operation of two of them. If a voter wishes to use the free ballot for a single candidate and to vote for two of the regularly nominated candidates, it is obvious that he must vote for all three of them through the free ballot depositing device. Still another way in which I provide against the fraudulent use of the free ballot depositing devices in the multi-candidate group is as follows:—I can disconnect all the interlocking rods from the free ballot depositing devices in the multi-candidate groups and throw them out of action entirely, which, of course, is undesirable, as the free ballot depositing device is a constitutional necessity on the machines in many of the States. This same result may be obtained by locking the free ballot depositing devices from behind, which may prevent their insertion. Again, I may accomplish this by driving wooden plugs into all the free ballot depositing devices, preventing the use of any of them during the election, which is equally undesirable. But still another method which is perhaps even better than the methods shown in Fig. 4 is as follows:—I may disconnect all of the interlocking rods for the free ballot depositing devices of each multi-candidate group or lock them all up except one in each multi-candidate group from behind preventing their being pushed in as is shown in Fig. 23. To this one free ballot depositing device, I may connect an interlocking rod 95 which will have a wedge 95' at the top of it sufficiently thick to interlock to the same extent as all of the several interlocking rods which are disconnected in that group. Thus in the group of coroner in Fig. 4, I would disconnect the interlocking rods from the free ballot depositing device in group 7 and lock up 8, and to 7 I would attach an interlocking rod which had a wedge twice as thick as that which had been removed, and in the group of constable in Fig. 4, I would do the same and attach to the free ballot depositing device in the 9th group an interlocking rod which had a wedge three times as thick as that which had been detached. Thus it can be readily seen that if in the group of coroner a regular key were voted, it would be impossible to use the free ballot depositing device, and in the group of constable, if a single regular key were voted, it would be impossible to use its free ballot depositing device. By this means I would do away with the strip which ordinarily must be used to lock all the free ballot depositing devices together in order to make their wedges all act together or not act at all.

In Figs. 28 and 29 I have shown the details of the free ballot receptacle. The base plate P of the machine is provided with a series of openings O, through which the free ballots can pass into the receptacles below. The free ballot receptacles consist of a series of little bags 32, which are carried on metal loops 33, which in turn are riveted to a strip of wood 30 which runs the length of the machine. These metal loops run through the whole length of the machine and occur one under each single candidate group. The bottom of the machine is open to provide sufficient room for the sacks 32. The sacks are closed by draw strings in the ordinary well known manner, and each sack is provided with a metal tag which indicates the number of the single candidate group to which it belongs. The bottom of the machine 34 is provided with a hinged, trough-like receptacle 35, which is pivoted to the bottom of the machine at 36 and is capable of being swung to several different positions. As shown in Fig. 28, the position in the full lines is the position which it has during the progress of an election, in which position it is locked until after the election is over. After the election the trough 35 is unlocked and swung to the position shown by the lowest dotted lines in Fig. 28, in which position the mouths of all the bags are accessible and the contents can be ascertained, which is necessary in making up the complete returns of the election. After the results of the election have been fully ascertained, the trough can be swung from the position shown by the lowest dotted lines in Fig. 28, to the position shown by the highest dotted lines in Fig. 28, in which case the side 37 of the trough becomes the bottom plate of the machine. This makes the free ballot receiver of the machine occupy a much more compact space.

The hasp 38 together with the lock constitutes the means by which the free ballot receptacle is locked during an election, and the hasp 39 with the lock constitutes the means by which the free ballot receptacle is locked after an election and while the machine is being shipped. It is necessary to turn up the bottom of the machine in this way in order to completely lower the machine on its trucks and make the machine as compact as possible while it is being shipped or is in storage.

By reference to Figs. 3, 4, 5, 9 and others, will be seen the provision which I make for straight ticket voting. At the left hand end of the machine, as shown in Figs. 3 and 4, are placed the straight ticket levers which move from right to left in order to vote a straight ticket. At the movement of the lever, all of the individual voting keys which belong to that party move down to the voted position, as shown by dotted lines at the top of Fig. 5. This is accomplished by means of the mechanisms shown in rear elevation in Figs. 9 and 14. The movement of the straight ticket lever to the left in Fig. 3 or to the right in Fig. 9 moves one of the straight ticket bars $T^2$, $T^3$, $T^4$, $T^5$, etc., correspondingly. A pin $t$ is placed on each bar for each individual candidate key in its row. This pin engages with the bell crank lever $u$, which is pivoted to the metal plate of the machine, and as the upper arm of the bell crank lever $u$ moves to the right with the straight ticket lever, the lower end moves up and raises the rear end of the counter-actuator, throwing down the voting key in front of the keyboard, by which means a straight ticket is readily voted. This affords also a means by which certain keys in each party row may be thrown out of operation if they are not needed in an election, by slipping the bell crank levers $u$ out of engagement with the pins $t$ by means shown in my Patent 879,664.

The resetting mechanism of my machine may be understood by reference to Figs. 1, 2, 3, 5, 9, 10, 11, 12, 13, 14 and others. On the end of the machine, as shown in Fig. 1, shaft C¹ is carried, at the lower end of which is an arm 50, which is swung in one direction as the voter enters the booth and in the opposite direction when he leaves it. On the top of the shaft C¹ is carried a cam plate D¹. This cam plate has a cam thereon similar to that shown in Figs. 30 and 31, by means of which cam plate the connecting rod 51 is reciprocated in one direction as the voter enters, and in the opposite direction as the voter leaves. This connecting rod 51 at its end engages with a pin 52, which in turn is carried by a bar E¹, which runs the whole length of the machine and is placed on the keyboard side of the main plate of the machine next to the keys, as shown in Fig. 13. At regular intervals a series of bell crank levers F¹ connect with pins on the bar E¹ and are operated by the reciprocation of the bar E¹. The other ends of the bell crank levers connect with the resetting bar on the other side of the main plate of the machine after the manner shown either in Figs. 9 or 13. The end of the bell crank lever may be slotted to receive a pin which is carried on the resetting bar Z, which pin extends from the resetting bar through the partition plate D into the slot on the bell crank lever. The partition plate D is slotted at w, w, as shown in Figs. 9 and 14, which slots act as guides which compel the resetting bar to move with a parallel movement, both ends being advanced equally and simultaneously, or, again, instead of the ends of the bell crank levers being slotted, they may carry a link, which in turn engages with the pins which extend through the partition plate, and by these means the resetting bar Z may be moved up and down.

In Fig. 12 I have shown an auxiliary resetting bar carried by the main resetting bar, which acts on the auxiliary interlocking system. By actual practice I have found that this was not necessary, as the main resetting bar, acting on the tops of the main interlocking rods which are always left in the machine, whether the plugs are removed or not, is sufficient through the wires 13 to reset the auxiliary interlocking rods. By reference to Fig. 5 it will be seen that the resetting bar is connected to the trip shaft Q by means of the link G¹ which connects to the arm H¹, which is rigid on the trip shaft Q. This provision is made at each end of the trip shaft. Thus it will be seen from Figs. 5 and 9 that when the resetting bar begins the descent the rotation of the trip shaft begins at once and the interlocking rods are lifted and trip some time before the resetting bar begins to come in contact with them, after which they are forced back to place by the resetting bar. It will also be seen from these figures that as long as the arm on the end of the machine remains in a fixed position in which it may be locked, none of the interlocking rods can be raised, and consequently the interlocking rods cannot be moved, as the counter-actuator is always in locked engagement with the four pointed star wheel, which prevents the star wheel from being turned except by moving the counter-actuator. The star wheel and the counter are locked against movement, and thus the record of the machine may be locked against change. In order to make the engagement between the dogs and the trip shaft the more positive when the keys are operated by the voter, I provide a gravity bar y, which is shown in Figs. 5 and 9, which runs the full length of the machine, resting on all the dogs, which tends to force them into engagement with the trip shaft as the interlocking rods are raised. This gravity bar y is carried in metal hooks z, which are fastened to the interlocking channel at regular intervals, in which the bar y is free to rise and fall to accommodate itself to the lifting of the dogs. As the voter enters the machine he swings the arm 50 behind him. This must be done or else the voter will find the machine locked as he attempts to vote. The arm 50 when thus swung behind the voter obviously acts as a barrier.

By reference to Figs. 12 and 13 will be seen the means which I employ to compel the locking of the keys against voting operation before the record on the counters of the machine can be exposed to view. The shutters 60 which control the inspection of the counter are shown in Figs. 12 and 13. These shutters are individual with each single candidate group of keys and counters and slide within the casing in front of each group of counters, as shown in Fig. 13. A universal bar 61 runs the full length of the machine above the keyboard, as shown in Fig. 12, and at regular intervals immediately above each column of counters it carries a pin 62 which the shutter 60 engages and by which it is lifted and lowered with the bar 61. The bar 61 has a series of pins 63 in it, as shown in Fig. 3, which engage with cam slots 64 in the plate 65, shown in Figs. 3 and 12. The shutters and their engagement with the bar 61 may also be seen in Fig. 3. When the election is over, the door 67 above the keyboard, as shown in Fig. 3, may be unlocked and swung up. The judge of elections can take hold of the knob 66 and slide the plate 65 to the right, thus lifting the universal bar 61 and with it the counter shutters. The plate 65 is several inches shorter than the machine, so that sufficient room is left for it to slide to the right and left and insure the raising and lowering of the counter shutters, while the bar 61 in turn is the same length as the inside length of the machine, and at each end fits snugly in its guides, which controls its vertical movement and prevents it from moving endwise. The bar 61 which has a vertical movement has riveted to it at its rear a lug 68, as is shown in full lines in Figs. 12 and 13 and in the dotted lines in Fig. 3. This lug in turn interlocks with the lug 69, which is carried by the universal bar E¹, shown at the top of Figs. 12 and 13. When this universal bar is in the position in which the resetting bar is raised so as to permit the operation of the keys and interlocking rods, it passes the lug 69 squarely over the lug 68 in the manner shown in Fig. 3, but when it is moved to the position where the resetting bar locks the interlocking rods down and thus locks the keys and counters against operation, the lug 68 on the universal bar 61 is free to rise, and hence the record of the counters can be exposed. And after this exposure has been made, the interlocking of the lugs 68 and 69 prevents the raising of the resetting bar until the counter shutters have been closed again. By these means I have a simple and effective means which keeps the counters from being moved while they are exposed to view.

*Yes and no voting.*—Figs. 15, 16, 17, 18, 19 and 20 show provisions which I make for voting on questions and amendments. The "Yes" and "No" keys are arranged in two vertical columns at the left hand end of the machine, as shown in Fig. 3, the "Yes" keys 72 being shown on the left hand side, and the "No" keys 73 on the right hand side of its counter, the "Yes" and "No" key of each pair being interlocked against each other. As shown in Fig. 15, the "No" key 73 occurs to the right hand side of its counter just the same as in any key or counter for any candidate. But the keys for the "Yes" counters 72 are placed on the left hand side of their counters so that the "Yes" key 72 and the "No" key 73 may be separated from each other as widely as possible, which makes it less confusing and reduces the liability of error to a minimum. As the units wheel of the counter occurs on the right hand side of the counter in every case, the counter must be actuated from the right hand instead of the left. And to carry the movement of the key 72 from the left hand side of the counter to the right hand side, it is necessary to place the counter-actuator on the right hand side of the counter and connect the key and counter-actuator by the yoke 74 shown in Figs. 15 and 16 pivoted to the shaft 76. The movement of the key 72 to the position shown in dotted lines moves the yoke 74 to the position shown in dotted lines, and it in turn raises the counter-actuator 75, which is on the other side of the counter from the key, to the position shown in dotted lines in Fig. 16. Each "Yes" key moves its counter-actuator which is on the opposite side of the counter from it by means of the yoke 74, while each "No" key moves its counter-actuator direct. This difference is brought out in Figs. 16 and 17, Fig. 16 showing the "Yes" key, and Fig. 17 showing the "No" key. The counter-actuator has connected to it the interlocking rod 77, as is shown in Fig. 18. But the interlocking is not accomplished in the ordinary way that is used throughout the rest of the machine. The tops of the interlocking rods need not be wedge shaped. In fact, the interlocking is not accomplished by them at all, the only purpose which they have being to lock the key down after it has been shoved down, or rather lock the counter-actuator up after it has been pushed up, for, as it is evident from Figs. 16 and 17, the keys of the "Yes" and "No" counters, as well as all other counters throughout the machine are pivoted to the same shaft that carries the counter and on a one way engagement with the counter-actuator by means of which it can raise the counter-actuator and its interlocking rod, but it cannot pull it down again. The tops of the interlocking rods project through the channel which carries the interlocking plugs for the rest of the machine and are guided by it but the interlocking plugs are omitted from this part of the channel, as it is obvious they could not be used with my arrangement. The interlocking rod carries the dog 1, such as is shown in Fig. 5 which locks the rod up after it has been operated. The interlocking between the "Yes" and "No" keys is accomplished by means of the swinging yoke 78, which is pivoted so as to swing between its pair of "Yes" and "No" keys. When one of the keys is raised, the counter-actuator strikes against the shoulder 79 and throws the yoke 78 over so that the opposite shoulder 79 is thrown directly over the counter-actuator 75 of the other key preventing it from rising, and as the counter-actuator of the raised key is squarely opposite the surface 80 of the yoke, prevents it from swinging back in order to raise the counter-actuator 75 on the other side. The yoke 78 is recessed so that the pivot of the next yoke above it may come within the yoke and to a certain extent it acts as a guide for it, which prevents it from swinging too far in the assembling of the machine.

It happens in some of the States that some voters are not privileged to vote on certain classes of questions, in which case it is necessary, when the voter is admitted to the machine, to lock the "Yes" and "No" keys on those questions against operation, and this is done by the means shown in Figs. 18, 19 and 20. This is provided for by means of two vertical shafts in one which are shown hexagonal, but made of any desired shape, which have screw holes in them opposite each pair of counter-actuators, and into these screw holes may be screwed the rods 82 according to the pairs of keys which it is necessary to lock out by means of the shaft 81. At the bottom of the shaft 81 is a handle 84, which projects out through the back cover of the machine and can be manipulated by the judge of the election to lock up certain parts of the "Yes" and "No" keys. On the other side of the "Yes" and "No" keys is a corresponding shaft 83 provided with corresponding screw holes into which the rods 82 may be screwed to effect a different locking combination. This shaft in turn is operated by another handle 85, so that by these means two groups of "Yes" and "No" lock-outs may be formed in each machine. When a voter is admitted to the booth who is a non-tax payer, as indicated at the bottom of Fig. 20, the handle 84 is swung to the left, which throws the rods 82 against the counter-actuators, preventing them from rising, thus locking those particular bars of keys against operation by the voter. A similar qualification may exist for the use of those keys which are controlled by the handle 85, so that discrimination against the voters can be practiced by means of these handles by the judges, and the bars 82 swing against the interlocking rods when they swing over the counter-actuators to prevent them from rising. The counter-actuator extends out a considerable distance beyond the interlocking rod, as may be seen from Fig. 5, so that the interlocking rod of the keys below may slide past the locking bar 82 without being obstructed thereby or binding against it. The dropping and resetting of the "Yes" and "No" interlocking rods and counter-actuators and keys is performed in the same manner and by the same means as any of the interlocking rods, counter-actuators and keys belonging to the candidates. The channel is recessed to act as guides for the locking rods 77, and sufficient opening is left where the rods pass through for them and no more, and thus a lug is left on the channel plate at 86 and again at 87 and 88. In the interlocking system for the regular candidates the opening is left continuous, as is shown in Fig. 5 for the placing of the interlocking blocks but as no interlocking blocks can be used in this connection, the channel here is shaped to merely act as a guide for the locking rods.

*The woman's lock out.*—In some of the States women are privileged to vote for certain classes of candidates, and when a woman is admitted into the machine to cast her vote on these candidates, it is necessary to lock up the rest of the machine against operation by her. The manner by which I provide for this feature on my machine may be seen in Figs. 10, 12, 13, 21, 24 and 25. A hexagonal shaft 96 runs the length of the machine, and at intervals it carries hangers 97 such as are shown in detail in Fig. 22, to the bottom of which is attached the woman's lock out bar 98. The shaft 96 is so positioned over the tops of the interlocking rods that when it is rocked, as may be seen from Figs. 12 and 13, the woman's lock out bar is swung in over the tops of the interlocking rods and prevents them from rising, thus effectually locking the keys connected to those interlocking rods against voting operation. This woman's lock out bar does not extend the whole length of the machine. It does not cover the interlocking rods of those candidates for which a woman is allowed to vote, as may be seen at the left hand side of Fig. 21. The interlocking rods, which are still free to rise, belong to candidates for such offices as school trustees, etc. The woman's lock out bar 98 is preferably operated from the back of the machine by a judge's push key 99, such as is shown in Fig. 25. The woman's lock out bar has also attached to it the arm or arms 100, as may be seen in Fig. 24, to which are connected the links 101, which at the bottom are connected to the bell crank levers 102. There are two of these links 101, as may be seen in the rear elevation of this feature in Fig. 21. Each of these links are connected to a bell crank lever 102. This bell crank lever is pivoted at 103, and at its other end it carries a pin 104, which engages in a slot 105 carried on the arm 106 which belongs to the straight irregular device 107, as shown in Fig. 24. This straight irregular device in most respects is similar to any of the free ballot depositing devices above described. This plate 106 is connected in turn to the locking rods 108 by a bell crank lever similar to that described in connection with the other free ballot depositing devices. This straight irregular device, as may be seen in Fig. 3, is very much longer than the ordinary irregular device, and both of the arms 106, shown in Fig. 21, are connected to this straight irregular device one at each end.

When the straight irregular is pushed in, the one side of the bell crank levers is rocked, which raises the locking rods 108 and engages their dogs 109 on the trip shaft to lock them up in the well known manner. As the locking rods 108 go up, the links 101 are pulled down, which rocks the arm 100 and the shaft 96, swinging the woman's lock out bar 98 over the tops of the locking rods. The straight irregular is thus attached to and moves with the woman's lock out bar, and when the judge, with the pin in the back of the machine, applies the woman's lock out, he also pulls in the straight irregular.

When a woman presents herself at the machine to vote, she is permitted to operate the lever 50, which unlocks the machine, but before she opens the door 128, the judge of election standing behind the machine should push on the pin 95, shown in Fig. 25, which will throw the lockout bar 98 forward to locking position. By so doing, the links 101 are pushed down and through the intermediate train of mechanism, the locking rod 108 is raised so that its dog 109 engages the trip shaft Q, thus interlocking the lockout bar 98 over the interlocking bars belonging to the keys, which the woman is not entitled to vote. This operation cannot be performed until the resetting bar of the machine Z has been raised by the operation of the arm 50 above described, as the bar Z and the bar 98 must each when performing their locking functions occupy the space immediately above the tops of the interlocking rods, and obviously both of these bars cannot occupy this space at the same time. When the arm 50 is swung in the reverse direction, the trip shaft raises the locking rods 108 until the trip shaft has passed underneath the dogs, when the bar 108 is free to fall again, immediately after which the resetting bar Z pushes the rods 108 down, which through the train of mechanism at the bottom and the links 108 causes the bar 98 to swing out from the dotted line position to the full line position, both shown in Fig. 24. The rods 108 pass up beyond the bar 108, as is shown in dotted line Fig. 24. The bar 98 in swinging in does not interfere with the rods 108, as the rods 108 and the bar 98 are confined to separate parts of the machine, as is shown in the rear elevation of Fig. 21. The rods 108 are not interlocked in the interlocking channel, as is shown by the absence of blocks in Fig. 21, although they are guided in passing through said channel in any suitable way. It will thus be seen that the woman's lockout bar 98 will be raised to normal position every time the machine is reset and it must be moved forward once for each voter that is not entitled to vote on that part of the machine, which is locked against operation by it. The straight irregular, however, has another feature aside from its attachment to the woman's lock out bar. When a voter is challenged, it is necessary to permit him to vote and yet keep his vote separate from the rest of the votes which are cast on the machine. This I provide for through the straight irregular device. Instead of permitting the voter to operate the levers, the challenged voter is instructed to prepare his ballot on paper, which is then identified by the judge. He then incloses it in a metal capsule. The voter is then allowed to enter the booth, but the arm on the end of the machine is held in the position in which all of the voting keys are locked against operation, but the latch 125 on top of the machine is lifted by the judge so that the arm 126 can be raised clear of the lug 127, which will permit the door 128 to be swung out by the voter, thus giving him access to the straight irregular device. He can then deposit the capsule in the straight irregular device and come out. The judge can replace the arm 126 over the lug 127 and lock it down by the latch 125. The judge then swings the arm on the end of the machine to the position in which the voting mechanism is unlocked, and with the pin from behind the machine pushes in the woman's lock out bar, which draws the straight irregular in to its locked position, then by swinging the arm on the end of the machine again, the ballot placed in the straight irregular by the voter is deposited in the proper receptacle of the machine. After the election these challenged votes are canvassed and are either counted or rejected again to the usual regulations.

The face plate of the machine is made up in the manner shown in Figs. 26 and 27. It is made in sections, a separate section for each single candidate group, as is shown in Fig. 26. The face plate 110 is made up of a single flanged piece of metal, which embraces its vertical row of counters and holds the train of counter-actuators positively geared together, either with or without a spacing strip such as is shown in one of my pending applications. At the right hand side are the vertical slots 111 through which the levers of the voting keys project. Cut transversely in the plate are the openings 112, which, together with the shutters 60, shown in Fig. 12, permit the viewing of the counters. Each section of the face plate is cut away to permit the free ballot receptacle to slide through it. At the bottom it is provided with the lips 114 which project into the recesses 115, which are formed on the base plate by means of the plate 116 and the removable plate 117 held in position by the screws 118. The top of each section is provided with the projections 119 struck out from the plate itself. The overhanging upper portion of the voting machine is provided with the angle irons 120, which engages with the upper end of each section 110 to hold it in place. This angle iron is slotted, so that by loosening the screws 121 the angle iron itself may be slid out sufficient to allow the projections 119 to pass up behind it, when the section 110 can be lifted far enough to allow the lips 114 to clear the slot 122, when it may be pulled out from the bottom and removed from the machine. The angle iron 120 is of sufficient length to hold several of them in. In this way, I provide a cheap and ready and effective way of holding the face plate of the machine in position, and provide that the face plate can be easily removed in order to reset the counters or turn some of the voting keys up out of operation or throw others down into operation, it being understood that the lever of each counter is pivoted in such a way to the counter-actuator that it can be thrown up behind the face plate out of reach of the voter or thrown down in the operative position.

Figs. 30 and 31 are top plan views of the machine, showing the arm 50 on the end of the machine which the voter swings to unlock the machine for voting operation or to reset and lock it after voting. At the top of the shaft C¹ carried on the end of the machine is the cam plate D¹ having a cam cut therein. By means of this cam, the connecting rod 51 is reciprocated, as is shown in the two different positions illustrated in Figs. 30 and 31. Upon the connecting rod 51 is carried the lug 127, which passes through a notch in the arm 126, which arm is pivoted to the door 128. In this way the arm 126 is interlocked with the connecting rod 51. In the position shown in Fig. 31, the door 128 cannot be opened and in the position shown in Fig. 30, the door 128 can be opened, and while it is open, the arm 126 locks the lug 127 against movement to the position in which it is shown in Fig. 31. Accordingly the lug 127 will not be withdrawn from its recess from the arm 126 until the arm 50 on the end of the machine has reached the position shown in Fig. 30, after which the door 128 is free to be opened, but until the arm 50 has reached the position shown in Fig. 30 and the resetting bar has been fully raised, and the trip shaft has consequently reached the position, which it should occupy during the voting operation of the keys, the door 128 cannot be opened. If it were possible to open the door prior to this time and thereby gain access to the straight ticket keys, which are concealed by the door, it would be possible to tamper with the machine by leaving the arm 50 on the position that the resetting bar was just high enough to allow the interlocking rods to go up far enough to operate the counter. In this position the trip shaft would not catch the dogs on the interlocking rods, and they could come down at once, thus advancing the counter one number. By repeating this operation of the straight ticket key, each counter along the party row might be made to count as many votes as the voter chose to make them, as long as he was thus permitted to manipulate the machine. It has been found in experience that these interlocking rods will fall down by gravity upon the reverse movement of the straight ticket key, thus completing the movement of the counter, and it is a comparatively easy matter to pull the straight ticket key a number of times, and accordingly beat the machine by causing it to register more votes than a voter is entitled to register. To prevent this, the door 128 is used and is interlocked with the connecting rod 51, which prevents the opening of the door 128 until the resetting bar and the trip shaft have reached their proper positions, the trip shaft being in such position that it will catch the dogs on the interlocking rods and lock the voting key against a repetition of its movement, thus preventing the operation of its counter more than once by that particular voter.

The door 128 is long enough to cover a portion of the keyboard longer than a voter could reach from around the end of the machine, as long as he had one hand on the arm 50. It covers the straight ticket keys, which, of course, are the most important, because they are placed at that end of the machine, and with them a voter could beat the machine more readily, if he were permitted to do so.

By reference to Fig. 32 will be seen the manner in which the counters are assembled and placed in the machine. As above stated, the machine is practically built entirely on the main plate D, which runs the whole length of the machine and separates the counters from the interlocking mechanism. This plate D has the slots 130 at regular intervals through which the counter-actuators pass to connect with the interlocking rods. The counter-actuators and voting keys are assembled with the counters and these are placed bodily in the machine in the following manner: The plates F, F, are provided with holes 131 at the top and bottom, through which tie rods 133 pass, which tie a series of them together. The assembling of the counters is begun by taking the long staples H, G, and first placing on them the plate at the right hand end of Fig. 32, after which the first set of keys, counter-actuators and counters are threaded on these staples, one arm of the staple carrying the counter wheels, the voting key and counter-actuator and the other arm of the staple carrying the star wheel and the transfer mechanism, as is seen from Figs. 5 and 7. The sleeves 132 are then threaded on the staples and these sleeves serve to hold apart the consecutive plates F, F. Another plate F is then threaded on the staples, and the counter-actuators, counters, sleeves and plates are threaded on in turn, repeating this indefinitely until the section of counters is assembled to the required size, the counters between each two consecutive plates F, F being the counters of a single candidate group. When the section has been assembled to the required size, the nuts are screwed on the threaded ends of the tie rods 133, clamping all the plates and counters together. Each plate F is provided with a flange 134, in which occur at regular intervals holes 135. When set in the machine, with the counter-actuators passing through the slots 130, the holes 135 in the flanges of the plates F register with the holes 130

136 in the back plate, so that a screw can pass through the back plate and the flange in each of the plates and tie the counter section to the back plate. The machine is usually built up by fastening a series of these counter sections to the back plate in the manner described.

Having thus described my invention, what I claim as new is as follows:—

1. In a voting machine, means for locking out a given number of office voting mechanisms, means controlling said means, means for voting for offices not locked out, and means to positively restore all of said means to normal to permit general voting.

2. In a voting machine, means for locking out a given number of office voting mechanisms, means for voting for offices not locked out, and means operative to positively restore both the lock out means and the voting means to normal, to permit general voting.

3. The combination in a voting machine of a plurality of indicators of a main resetting and locking means therefor of an auxiliary locking means independently movable to a position for locking a plurality of said indicators against movement, means operating to reset said indicators through said main locking means, said operating means causing the resetting of said auxiliary locking means.

4. The combination in a voting machine of indicators, means for resetting and locking said indicators, and auxiliary locking means to prevent the operation of a plurality of said indicators, said auxiliary locking means being thrown out of locking position by the operation of said resetting means.

5. The combination in a voting machine, of indicators, operating mechanism for the machine causing the resetting of said indicators when moved in one direction, means preventing the operation of a plurality of said indicators until said operating mechanism for the machine has reached a predetermined point in its movement in the reverse direction.

6. The combination in a voting machine of indicators, a main locking means therefor, an auxiliary locking means therefor, movable to locking position independent thereof.

7. The combination in a voting machine of indicators, means for resetting and locking said indicators, an auxiliary locking means to prevent the operation of a plurality of said indicators, said auxiliary locking means being positively moved out of locking position during the resetting movement of said resetting means.

8. The combination in a voting machine of interlocking devices, a resetting bar to lock said devices, an oscillating shaft having means for engagement with said interlocking devices, whereby the interlocking devices may be locked against movement.

9. The combination in a voting machine of individual keys and straight ticket keys, a lever on said machine which when moved by the voter in one direction operates means to reset and lock the keys, and operates said means when moved in the reverse direction to unlock said keys for voting operation, secondary means for preventing the operation of the straight ticket keys, after they have been unlocked by said lever until said lever has reached a predetermined position.

10. The combination in a voting machine of a series of keys, a lever carried on said machine controlling the operation of said keys, a second series of keys carried on said machine, and also controlled by said lever, an auxiliary means for controlling the second series of keys and preventing the operation of them until the said lever has reached the end of its movement.

11. The combination in a voting machine of indicators, means operating when moved in one direction to reset said indicators, means for preventing the operation of a plurality of said indicators until said resetting means has reached a predetermined point in its movement in the reverse direction.

12. The combination in a voting machine of indicators, means operating when moved in one direction to reset said indicators, means for preventing the operation of a plurality of said indicators until said resetting means has completed its movement in the reverse direction.

13. In a voting machine, the combination of resetting mechanism and a woman's lockout, said lockout being restored from its locking position to its normal position directly by the operation of said resetting mechanism.

14. In a voting machine, the combination of parts adapted to be operated by a voter and divided into groups, a regular interlocking mechanism for each group, and an auxiliary interlocking mechanism for each group, both of said interlocking mechanisms being adapted to be operated by the movement of the parts operated by the voter, whereby a group may be formed within a group.

15. In a voting machine the combination of vote indicators, resetting mechanism and a woman's lockout mechanism therefor, said lockout mechanism being capable of movement independently to locking position, said lockout mechanism being restored from its locking position to its normal position directly by the operation of the said resetting mechanism.

16. The combination in a voting machine, of voting mechanisms, the interlocking mechanism therefor, the main interlocking channel, locking blocks carried by said channel, an auxiliary interlocking channel, interlocking blocks carried by said auxiliary channel, and grouping devices in each channel, blocks in the main channel being removable to provide for multi-candidate voting with the auxiliary channel.

17. The combination in a voting machine, of voting mechanisms, and a plurality of interlocking rods attached to each voting mechanism, whereby it may be interlocked in more than one place.

18. The combination in a voting machine, of voting mechanisms and a plurality of interlocking rods attached to each voting mechanism, one of said rods being capable of use to lock the key in its voted position and the other interlocking rods being used to interlock the key with the remaining keys in its group.

19. The combination in a voting machine, of voting mechanisms and interlocking rods therefor, each voting mechanism having connected to its interlocking rod an auxiliary interlocking rod parallel therewith and connected thereto by detachable means, whereby any or all of the auxiliary interlocking rods may be connected to the corresponding main interlocking rods.

20. The combination in a voting machine, of a series of voting mechanisms, each voting mechanism being provided with an interlocking rod, a channel carrying interlocking blocks for said interlocking rods, a second series of interlocking rods parallel to the first series of interlocking rods, a channel carrying interlocking blocks for said second series of interlocking rods, and a detachable connection between each rod of the first series and the corresponding rod in the second series.

21. The combination in a voting machine, of a series of voting mechanisms, interlocking means for each of said voting mechanisms, and auxiliary interlocking means for each voting mechanism, whereby it may be interlocked in a plurality of series.

22. In a voting machine, the combination of voting mechanisms, two series of interlocking means, and adjustable means whereby the second series of interlocking means can be used interchangeably for either multi-candidate group voting or for indorsed candidate voting.

23. In a voting machine, the combination of voting mechanisms, a plurality of interlocking systems therefor, each comprising a series of interlocking wedges and blocks, and means for detachably connecting an interlocking wedge of one system to its corresponding interlocking wedge in the other system.

24. The combination in a voting machine, of a plurality of interlocking systems, the first of said interlocking systems being capable of adjustment for multi-candidate group voting, the second of said interlocking systems being capable of adjustment for single candidate group voting, each of said systems having interlocking rods and detachable means between the main interlocking rods to provide for indorsed candidate voting by means of the interlocking rods of the auxiliary system.

25. The combination in a voting machine, of a series of voting mechanisms, an interlocking rod for each voting mechanism an interlocking channel for said interlocking rods, and a wire loop fastened to the interlocking channel and embracing a plurality of consecutive interlocking rods for indorsed candidate voting.

26. The combination in a voting machine, of voting keys arranged in a plurality of office lines, interlocking means attached to each voting key, a single channel for interlocking all of said interlocking means, and means for preventing any predetermined number of said interlocking means from being moved, thereby locking their keys against operation.

27. The combination in a voting machine, of voting keys, interlocking means attached to each voting key, a single channel for interlocking all of said interlocking means, a single bar for positively resetting and locking all of said voting keys through the interlocking means, and another bar moved to locking position to lock a predetermined number of keys against operation through their interlocking means.

28. The combination in a voting machine, of free ballot depositing devices, one for each single candidate group, and regular voting mechanisms interlocked therewith, means for combining a plurality of single candidate groups into a multi-candidate group, and means for locking all but one of said free ballot depositing devices out of operation in the multi-candidate group, said one free ballot depositing device being provided with an interlocking rod, the wedge of which is proportionate to the size of the group.

29. The combination in a voting machine, of free ballot depositing devices, one for each single candidate group, and regular voting mechanisms interlocked therewith, means for combining a plurality of single candidate groups into a multi-candidate group, and means for locking all of said free ballot depositing devices out of operation, except one in the multi-candidate group, said one free ballot depositing device being provided with an interlocking rod, the wedge of which will prevent the operation of its free ballot depositing device, if a single regular key has been operated in that group.

30. The combination in a voting machine, of a straight irregular ballot depositing device, in which a voter can place a challenged vote, means operated by the judge to move the straight irregular device to voted position, and other means operated by the judge to cast said straight irregular ballot and reset the machine.

31. The combination in a voting machine, of a receptacle for a challenged vote, means to lock the voting mechanisms against operation while the voter is depositing the challenged vote, means operated by the judge of elections to unlock the voting mechanism after the voter has left the booth, other means operated by the judge of elections to move said receptacle to voted position, and means operated by the judge to deposit said challenged vote in the machine and reset the machine and lock the voting mechanisms.

32. The combination in a voting machine, of a single resetting bar to positively reset and lock the voting mechanisms, and a woman's lockout bar operating on the same parts to lock the predetermined voting mechanisms against voting operation, said woman's lockout being operated by a pin from the back of the machine.

33. The combination in a voting machine, of a single resetting bar to positively reset and lock the voting mechanism, a woman's lockout bar operating on the same parts to lock the predetermined voting mechanisms against voting operation, and means operable by the judge of elections to move said woman's lockout bar to its locking position.

34. The combination in a voting machine, of a single resetting bar to positively reset and lock the voting mechanisms, a woman's lockout bar operating on the same parts to lock predetermined mechanisms against voting operation, and means for moving said woman's lockout bar to locking position.

35. The combination in a voting machine of a single resetting bar operating through the interlocking pieces to positively reset and lock the voting mechanisms, a woman's lockout bar operating on the same parts to lock certain predetermined mechanisms against voting operation, and means for moving said woman's lockout bar to locking position.

36. The combination in a voting machine, of a single resetting bar to positively reset and lock the voting mechanisms, a woman's lockout bar operating on the same parts to lock the predetermined mechanisms against voting operation, means for moving said resetting bar to locking position, and independent means for moving said woman's lockout bar to locking position.

37. The combination in a voting machine, of a single resetting bar to positively reset and lock the voting mechanisms, an auxiliary locking bar operating in the same parts to lock a predetermined number of the voting mechanisms against voting operation, and means for moving said auxiliary locking bar to locking position.

38. The combination in a voting machine, of a single resetting bar operating through the interlocking pieces to positively reset and lock the voting mechanisms, an auxiliary locking bar operating on the same parts to lock certain predetermined mechanisms against voting operation, and means for moving said auxiliary locking bar to locking position.

39. The combination in a voting machine, of a single resetting bar to positively reset and lock the voting mechanisms, an auxiliary locking bar operating on the same parts to lock predetermined mechanisms against voting operation, means for moving said resetting bar to locking position, and means for moving said auxiliary locking bar to locking position.

40. The combination in a voting machine, of a resetting bar operating to positively reset and lock the voting mechanisms, an auxiliary locking bar operating to lock certain predetermined mechanisms against operation, and means for moving each locking bar to its locking position.

41. The combination in a voting machine, of a resetting bar operating to positively reset and lock a plurality of voting mechanisms, an auxiliary locking bar operating to lock a predetermined number of voting mechanisms, and means for moving each locking bar to its locking position.

42. The combination in a voting machine, of a plurality of locking bars and a plurality of voting keys capable of being locked against voting operation by either of said locking bars.

43. The combination in a voting machine, of a plurality of voting mechanisms, interlocking parts connected thereto and a plurality of locking bars, said voting mechanisms being capable of being locked against voting operation by either of said locking bars acting upon the interlocking parts.

44. In a voting machine, the combination of keys, regular interlocking mechanism and auxiliary interlocking mechanism therefor, said interlocking mechanisms being composed of interlocking rods interlocking in channels parallel to each other, the interlocking rods of the auxiliary mechanism being capable of connection or disconnection to the interlocking rods of the regular interlocking mechanism, the regular interlocking mechanisms being connected directly to the keys.

45. In a voting machine, mechanism for voting for candidates for a plurality of offices, means for preventing the operation of voting mechanism for a number of offices less than the whole number to be voted for, and means operating as a barrier for positively restoring the preventing means to normal to permit general voting.

46. The combination in a voting machine of voting keys and a plurality of interlocking devices for each key forming part of a permanent structure, means for making any or all of said interlocking devices operative or inoperative at will.

47. The combination in a voting machine of a plurality of keys and a plurality of interlocking devices for each key forming a part of a permanent structure, means for controlling the operation of each key by either one or all of the plurality of its interlocking devices.

48. In a voting machine, the combination of keys and multicandidate group interlocking mechanism therefor that limits the total number of keys that can be voted in a group, and that permits voting of any two keys in a single office line, and means forming a permanent part of the machine that can be connected or disconnected with any two or more keys of a single office line, so as to limit the number of such keys that can be voted.

49. The combination in a voting machine of voting keys and a plurality of interlocking devices for each key forming part of the permanent structure, each of said interlocking devices normally moving with their key one of said devices being detachable from its key.

50. The combination in a voting machine of voting keys, two interlocking channels carrying interlocking blocks arranged for said keys, two interlocking devices for each key having connections therewith and movable therewith, one of said devices engaging with the interlocking blocks of the one channel, and the other of said devices engaging with the blocks of the other channel, the connections of one of said devices being detachable.

51. The combination in a voting machine of voting keys, two interlocking channels carrying interlocking blocks arranged for said keys, two interlocking devices for each key having connections therewith and movable therewith, one of said devices engaging with the interlocking blocks of the one channel, and the other of said devices engaging with the blocks of the other channel, the connections of one of said devices being detachable, all of said parts forming part of the permanent structure.

52. In a voting machine, the combination of a frame consisting of plates having flanges thereon, said plates being arranged in parallel series and spaced evenly apart and clamped together, of counters and a plurality of parallel counter shafts therefor, each of which shafts passes through all of said plates, and each of which carries a plurality of counters mounted thereon, the counters being spaced thereon between the successive plates, a main plate of the machine for supporting said frame, and means for fastening said frame on said plate through the flanges of the plates of the frame.

53. In a voting machine, the combination of a frame consisting of a plurality of plates arranged in parallel series and spaced evenly apart and clamped together, of counters and a plurality of parallel supporting shafts or spindles therefor, each of which shafts passes through all of said plates and each of which carries a plurality of counters mounted thereon, the counters being spaced thereon between the successive plates, a main plate of the machine for supporting said frame and means for fastening said frame on said plate.

In testimony whereof, I affix my signature, in presence of two witnesses.

ANGUS McKENZIE.

Witnesses:
W. ELYAING,
FRANK KEIFER.